US008307342B2

(12) United States Patent
Oglesby et al.

(10) Patent No.: US 8,307,342 B2
(45) Date of Patent: Nov. 6, 2012

(54) METHOD, APPARATUS, AND SYSTEM FOR AUTOMATIC TEST GENERATION FROM STATECHARTS

(75) Inventors: David Oglesby, Brooklyn Center, MN (US); Kirk Schloegel, Golden Valley, MN (US); Devesh Bhatt, Maple Grove, MN (US); Stephen O. Hickman, Eagan, MN (US)

(73) Assignee: Honeywell International Inc., Morristown, NJ (US)

( * ) Notice: Subject to any disclaimer, the term of this patent is extended or adjusted under 35 U.S.C. 154(b) by 1100 days.

(21) Appl. No.: 12/136,146

(22) Filed: Jun. 10, 2008

(65) Prior Publication Data

US 2009/0287963 A1  Nov. 19, 2009

Related U.S. Application Data

(60) Provisional application No. 61/053,205, filed on May 14, 2008.

(51) Int. Cl.
*G06F 9/44* (2006.01)
(52) U.S. Cl. ........................................................ 717/124
(58) Field of Classification Search .................. 717/124, 717/126
See application file for complete search history.

(56) References Cited

U.S. PATENT DOCUMENTS

| | | | |
|---|---|---|---|
| 4,216,539 | A | 8/1980 | Raymond et al. |
| 5,729,554 | A | 3/1998 | Weir et al. |
| 5,913,023 | A | 6/1999 | Szermer |
| 5,918,037 | A | 6/1999 | Tremblay et al. |
| 6,002,869 | A | 12/1999 | Hinckley |
| 6,112,312 | A | 8/2000 | Parker et al. |
| 6,173,440 | B1 | 1/2001 | Darty |
| 6,449,667 | B1 | 9/2002 | Ganmukhi et al. |
| 6,473,794 | B1 | 10/2002 | Guheen et al. |
| 6,505,342 | B1 | 1/2003 | Hartmann et al. |
| 6,615,166 | B1 | 9/2003 | Guheen et al. |

(Continued)

FOREIGN PATENT DOCUMENTS

EP   1577755   9/2005

(Continued)

OTHER PUBLICATIONS

Anirudhan et al. , "Symbolic Test Generation for Hierarchically Modeled Digital Systems", "International Test Conference 1989", 1989, pp. 461-469, Publisher: IEEE, Published in: Washington DC, USA.

(Continued)

*Primary Examiner* — Anna Deng
(74) *Attorney, Agent, or Firm* — Fogg & Powers LLC

(57) ABSTRACT

An apparatus and methods for generating a plurality of output test vectors from a statechart are provided. The statechart may specify requirements of a system function to be executed by a system-performing device. The statechart comprises a plurality of states, a plurality of transitions, and a plurality of variables. A forward-propagation pass through the statechart may be performed to generate a plurality of forward-reached-transition environments. A backward-propagation pass through the statechart may be performed to generate a plurality of backward-reached-transition environments. The plurality of output test vectors is generated from the plurality of forward-reached-transition environments and/or the plurality of backward-reached-transition environments. A test driver may execute a plurality of tests on the system-performing device, wherein the plurality of tests are based on the plurality of output test vectors.

17 Claims, 10 Drawing Sheets

U.S. PATENT DOCUMENTS

| | | |
|---|---|---|
| 6,671,874 B1 | 12/2003 | Passova |
| 6,675,138 B1 | 1/2004 | Hollander et al. |
| 6,728,939 B2 | 4/2004 | Johannsen |
| 6,938,228 B1 | 8/2005 | Zhong |
| 6,944,848 B2 | 9/2005 | Hartman et al. |
| 7,103,620 B2 | 9/2006 | Kunz et al. |
| 7,117,487 B2 | 10/2006 | Meredith et al. |
| 7,174,536 B1 | 2/2007 | Kothari et al. |
| 7,185,318 B1 | 2/2007 | Zimmerer |
| 7,219,328 B2 | 5/2007 | Schloegel et al. |
| 7,272,752 B2 | 9/2007 | Farchi et al. |
| 7,296,188 B2 | 11/2007 | Paternostro et al. |
| 7,334,219 B2 | 2/2008 | Cebula et al. |
| 7,457,729 B2 | 11/2008 | Khoche et al. |
| 7,644,334 B2 | 1/2010 | Hickman et al. |
| 7,813,911 B2 | 10/2010 | Triou, Jr. et al. |
| 2002/0071504 A1* | 6/2002 | Chen et al. .................. 375/341 |
| 2003/0128214 A1 | 7/2003 | Oglesby et al. |
| 2004/0044990 A1 | 3/2004 | Schloegel et al. |
| 2004/0088677 A1 | 5/2004 | Williams |
| 2005/0004786 A1 | 1/2005 | Thomason |
| 2005/0223295 A1 | 10/2005 | Hermes et al. |
| 2006/0010428 A1 | 1/2006 | Rushby et al. |
| 2006/0101402 A1 | 5/2006 | Miller et al. |
| 2006/0155520 A1 | 7/2006 | O'Neill et al. |
| 2006/0206870 A1 | 9/2006 | Moulden, Jr. et al. |
| 2006/0253839 A1 | 11/2006 | Avritzer et al. |
| 2006/0265691 A1 | 11/2006 | Klinger et al. |
| 2007/0028219 A1 | 2/2007 | Miller et al. |
| 2007/0028220 A1 | 2/2007 | Miller et al. |
| 2007/0266366 A1 | 11/2007 | Bucuvalas |
| 2007/0288899 A1 | 12/2007 | Fanning et al. |
| 2008/0015827 A1 | 1/2008 | Tryon, III et al. |
| 2008/0028364 A1 | 1/2008 | Triou et al. |
| 2008/0086705 A1 | 4/2008 | Balasubramanian et al. |
| 2008/0120521 A1 | 5/2008 | Poisson et al. |
| 2008/0126902 A1 | 5/2008 | Hickman et al. |
| 2009/0172647 A1 | 7/2009 | Telang |
| 2009/0287958 A1 | 11/2009 | Bhatt et al. |
| 2010/0192128 A1 | 7/2010 | Schloegel et al. |
| 2011/0035465 A1* | 2/2011 | Kuwata et al. ............... 709/217 |

FOREIGN PATENT DOCUMENTS

| | | |
|---|---|---|
| EP | 1677187 | 7/2006 |

OTHER PUBLICATIONS

European Patent Office, "European Search Report", May 18, 2010, Published in: EP.

Hi-Keung Tony Ma et al., "Test Generation for Sequential Circuits", "IEEE Transactions on Computer Aided Design of Integrated Circuits and Systems", Oct. 1, 1988, pp. 1081-1093, vol. 7, No. 10, Publisher: IEEE, Published in: Piscataway, NJ, USA.

Niermann et al., "HITEC: A Test Generation Package for Sequential Circuits", "Proceedings of the European Conference on Design Automation", 1991, pp. 214-218, Publisher: IEEE, Published in: Los Alamitos, CA, USA.

Object Management Group (OMG), "OMG Unified Modeling Language Specification, version 1.5," Mar. 1, 2003,Chapter 3, Part 9, pp. 3-135 to 3-154.

The Mathworks, "Stateflow 7—Design and Simulate State Machines and Control Logic," 2007.

The Mathworks, "Simulink 7—Simulation and Model-Based Design," 2007.

R.E. Moore, "Interval Arithmetic and Automatic Error Analysis in Digital Computing," Nov. 15, 1962.

D. Bhatt, S. Hickman, K. Schloegel, D. Oglesby, "An Approach and Tool for Test Generation from Model-Based Functional Requirements," May 2007.

D. Bhatt, S. Hickman, K. Schloegel, D. Oglesby, V. Jacobsen, "HiLiTE—Honeywell Integrated Lifecycle Tools and Environment," Slides Version 2, Apr. 2008.

Aharon et al., "Test Program Generation for Functional Verification of PowerPC Processors in IBM", "http://citeseerx.ist.psu.edu/viewdoc/download?doi=10.1.1.11.5009&rep=rep1&type=pdf Retrieved Apr. 2, 2012", 1995, pp. 1-7.

Bhatt, D. et al, "Model-Based Development and the Implications to Design Assurance and Certification", "Digital Avionics Systems Conference", Oct. 30, 2005, pp. 1-14, vol. 2, Publisher: IEEE.

Dislis, C. et al., "Formal Design Techniques—Theory and Engineering Reality", "Proceedings of the 7th Asian ATS Test Symposium", Dec. 2-4, 1998.

Mathaikutty et al., "Model-driven Test Generation for System Level Validation", "PL LAB", Jan. 24, 2008, Publisher: Korea Advanced Institute of Science and Technology.

Neema, S. et al., "Signal Processing Platform: A Tool Chain for Designing High Performance Signal Processing Applications", "Proceedings IEEE", Apr. 8-10, 2005, pp. 302-307, Publisher: Southeastcon, Published in: Ft. Lauderdale, FL.

Rutherford et al., "A Case for Test-Code Generation in Model-Driven Systems", Apr. 2003, pp. 1-16, Publisher: Department of Computer Science University of Colorado.

U.S. Patent and Trademark Office, "Office Action", "U.S. Appl. No. 12/360,743", Apr. 13, 2012.

\* cited by examiner

500 Environment
    510 Set of Active States
    520 Set of Current Values
    530 Multi-Step Vector
        532 Prior-State List
        534 Prior-Transition List
        536 Set of Previous Values

FIGURE 5

| | A | B | C | D | E | F | G | H | I | J |
|---|---|---|---|---|---|---|---|---|---|---|
| 1 | HiLITE-1-0-0- | ColumnContent | Vector | Initialize | ColumnNa | Comment | Information | | | |
| 2 | Information | Chart="Chart" | Date="2/2 | HiLite Version="6.2.4.10742" | | | | | | |
| 3 | ColumnContent | RepetitionCount | Event | Input:1 | Output:1 | State:0 | State:1 | State:2 | State:3 | State:4 |
| 4 | ColumnName | | | in1 | out1 | State1 | State1_1 | State1_1_1 | State4 | State2 |
| 5 | Comment | | | | | | | | | |
| 6 | Initialize | | | | | | | | | |
| 7 | InterfaceCounts | | 1 | 1 | 9 | | | | | |
| 8 | Comment | REACH State State1 | | | | | | | | |
| 9 | Comment | REACH State State1_1 | | | | | | | | |
| 10 | Comment | REACH State State1_1_1 | | | | | | | | |
| 11 | Comment | REACH Transition segment from Initial to State1_1_1 | | | | | | | | |
| 12 | Comment | REACH Transition segment /{local2 = -100} from Initial to State1_1 | | | | | | | | |
| 13 | Comment | REACH Transition segment from Initial to State1 | | | | | | | | |
| 14 | Vector | | 1 | T | | A | A | A | | |
| 15 | Comment | REACH exit actions for state State1_1_1 | | | | | | | | |
| 16 | Comment | REACH exit actions for state State1_1 | | | | | | | | |
| 17 | Comment | REACH exit actions for state State1 | | | | | | | | |
| 18 | Comment | REACH State State2 | | | | | | | | |
| 19 | Comment | REACH State State2_1 | | | | | | | | |
| 20 | Comment | REACH Transition segment from Initial to State2_1 | | | | | | | | |
| 21 | Comment | REACH Transition segment [in1 > 100] from State1 to State2 | | | | | | | | |

FIGURE 10

METHOD, APPARATUS, AND SYSTEM FOR AUTOMATIC TEST GENERATION FROM STATECHARTS

RELATED APPLICATION

The instant application is related to and incorporates by reference the entirety of U.S. patent application Ser. No. 11/945,021, "Requirements-Based Test Generation," filed on Nov. 26, 2007.

BACKGROUND OF THE INVENTION

Description of the Problem

The present invention relates generally to verification of computer software, and more particularly to automated test generation using statecharts.

Verification of algorithm implementations is extremely costly, particularly for aerospace applications that need to be certified. Most of the verification efforts and costs are in testing a software implementation against its design specifications; by automating this verification process, the test generator described herein can substantially reduce the cost and cycle time of system development and certification.

This automated test generation is possible due to the widespread industry practice of capturing the software design as a statechart. The DO-178B certification standard used by the FAA is an example of an industry requirement that implemented code comport with the design specification and low-level requirements embodied in the corresponding statechart. The Unified Modeling Language (UML) specification comprises a standard for specifying statecharts. See Object Management Group (OMG), *OMG Unified Modeling Language Specification*, version 1.5, Mar. 1, 2003, Chapter 3, Part 9, pages 3-135 to 3-154. Other methods and descriptions of statecharts and similar finite automata have been used to describe software design and/or requirements as well, including Harel statecharts, state diagrams, and finite state machines, among others.

The current commercial off the shelf tools and techniques for generating tests using these statecharts achieve structural code coverage only. Further, the off the shelf tools may take an excessive amount of time to generate tests from a statechart.

BRIEF SUMMARY OF THE INVENTION

A first embodiment of the invention provides a method for creating a plurality of output test vectors from a statechart. The statechart specifies requirements of a system function to be executed by a system performing device. The statechart comprises a plurality of states, a plurality of transitions, and a plurality of variables. One or more transitions in the plurality of transitions include a condition expressed in terms of at least one variable in the plurality of variables. A forward-propagation pass through the statechart is performed to propagate the plurality of transitions in the forward direction. A forward-reachable-transition environment is generated for each transition propagated during the forward-propagation pass. The output test vector is created based on the generated forward-reachable-transition environment.

A second embodiment of the invention provides a test generator. The test generator comprises a processor, data storage, and machine-language instructions (MLIs) stored in the data storage and executable by the processor. The test generator receives a statechart. The test generator generates a plurality of forward-reachable-transition environments using a forward-propagation pass through the statechart. The test generator generates each forward-reachable-transition environment in the plurality of forward-reachable-transition environments for a forward-reachable transition propagated during the forward-propagation pass. The test generator determines if a transition was unreached during the forward-propagation pass. In response to the determination, the test generator can generate a plurality of backward-reachable-transition environments via a backward-propagation pass through the statechart. The test generator generates each backward-reachable-transition environment in the plurality of backward-reachable-transition environments for a backward-reachable transition propagated during the backward-propagation pass. The test generator generates a plurality of output test vectors from the plurality of forward-reachable-transition environments and the plurality of backward-reachable-transition environments. The test generator outputs the plurality of output test vectors.

A third embodiment of the invention provides a method for performing a backward-propagation pass through a statechart. The statechart specifies requirements of a system function to be executed by a system-performing device. The statechart comprises a plurality of states, a plurality of variables and a plurality of transitions. At least one transition of the plurality of transitions includes a condition expressed in terms of at least one variable in the plurality of variables. A candidate-backward-reachable transition (CBRT) is retrieved from an unreached-transition list. An associated timestep-sequence object (ATSO) is generated, where the ATSO is associated with the CBRT. A determination is made that a complete-constraint expression of the retrieved ATSO is satisfied. Responsive to determining that the complete-constraint expression of the retrieved ATSO is satisfied, a CBRT environment is updated as a backward-reached transition.

BRIEF DESCRIPTION OF THE DRAWINGS

Various examples of embodiments are described herein with reference to the following drawings, wherein like numerals denote like entities, in which:

FIG. 5 is a schematic view of an example data structure for an environment, in accordance with embodiments of the invention;

FIG. 10 is an example human-readable form of a plurality of output test vectors for the statechart indicated in FIG. 3, in accordance with embodiments of the invention.

DETAILED DESCRIPTION OF THE INVENTION

Figure 1:
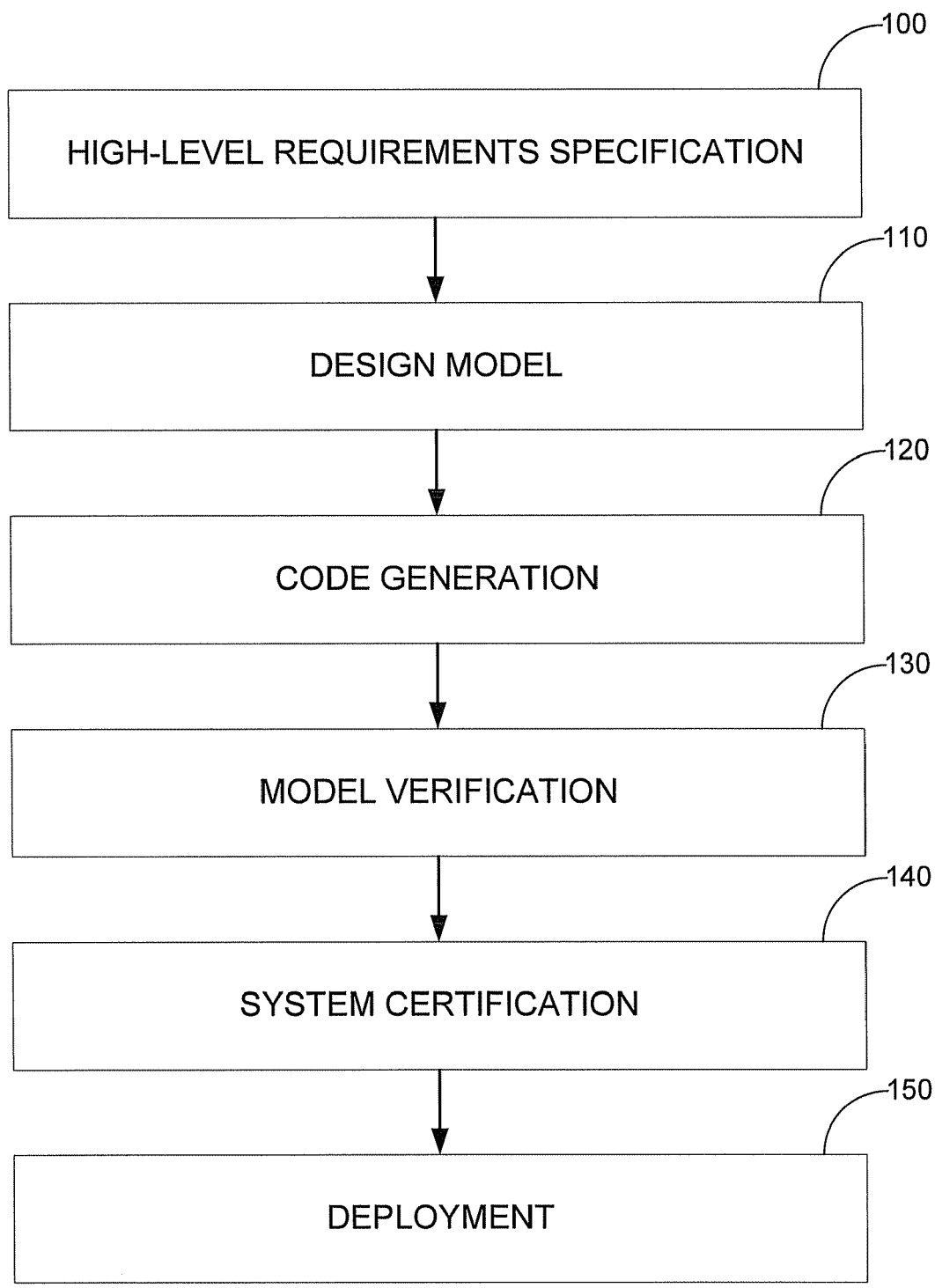
FIG. 1 is a flowchart of an example system development process, in accordance with embodiments of the invention.

This invention relates to the development and verification of systems designed using statecharts and to be implemented in a combination of computer software, firmware, and hardware. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

Overview

In general, the present invention relates to verification using statecharts that specify requirements for systems that will eventually be implemented in some combination of software and hardware. The present invention operates on a statechart specifying requirements of the behavior of a system-performance device (e.g., a computer processor) performing a system function. Examples of system functions are controlling a sensor (e.g., an air flow sensor, a temperature sensor, or a fuel-flow sensor) that is part of an aircraft, motor vehicle or other mechanical device, analyzing various inputs, such as satellite signals, as part of a navigation system, operating a control surface or other portion of an aircraft, and processing user input and/or output. Many other system functions are possible as well.

A statechart may be a graph or diagram of a deterministic finite automaton (DFA). As such, a statechart comprises a plurality of states, each of which describe a condition of a system-performing device performing a system function, as well as a plurality of transitions, each of which indicates a path from a source state to a destination state. Each transition may comprise one or more conditions. A condition is a prerequisite that must be satisfied before traversing the transition. As such, a condition may model a requirement of the behavior of the system-performance device. For example, a statechart may have "awaiting input" and "input received" states. A transition between the "awaiting input" and "input received" states may have a condition such as "input buffer not empty". Before the transition from the "awaiting input" state to the "input received" state may be traversed, the "input buffer not empty" condition must be satisfied.

Each state may specify one or more statechart-defined variables. A variable is used within the statechart to store a value. For example, a variable "x" of the statechart may store a value such as the integer value "3". A statechart may comprise one or more statechart-input variables, or values provided to the device before performing the system function, and one or more statechart-output variables, or values output by the device after performing the system function. Each condition may be expressed in terms of the statechart-defined variables, the statechart-input variables and/or the statechart-output variables.

The objective is to verify that the implementation of the system-performing device complies with the requirements embodied in the statechart. To achieve this objective, a test generator may be used. Preferably, the test generator is the Honeywell Integrated Lifecycle Tools and Environment (Hi-LiTE) computer software package provided by Honeywell International, Inc. of Morristown, N.J.

The test generator facilitates meeting DO-178B objectives by generating test vectors. The test generator generates a plurality of output test vectors to cover the requirements embodied in the statechart. A first pass, using forward propagation of statechart-input variables along the transitions of the statechart, is performed. For each transition traversed during the first pass, a forward-reachable-transition environment is generated.

If any transitions are not traversed by the first pass, a backward-propagation pass through the statechart may be performed to propagate the plurality of transitions in the backward direction. The backward-propagation pass may generate a backward-reachable-transition environment for each transition propagated during the backward-propagation pass. Then, a plurality of output test vectors may be generated from the generated forward-reachable-transition environments and the backward-reachable-transition environments.

The forward-propagation and backward-propagation passes may be performed in combination. One or more iterations of the forward-propagation pass, the backward-propagation pass, or a combination of forward-propagation and backward-propagation passes may be performed. Iterations of the forward-propagation pass, backward-propagation pass, or the combination of forward-propagation and backward-propagation passes may be performed until (a) all transitions in the model are propagated, (b) no new tests are generated with both the forward-propagation and backward-propagation passes, or (c) a fixed number of iterations have been executed (e.g. one iteration of the combination of the combination of forward-propagation and backward-propagation passes).

An automated testing system, such as a test driver or test harness, may use these test vectors to verify the requirements embodied in the statechart. The requirements may be verified by the test driver testing the system-performing device. Because application developers currently use costly inspection procedures and manual test generation to meet DO-178B objectives, this automation of the process can dramatically reduce the time and resources needed for verification. Alternatively, human readable tests may be generated from the test vectors and human testers may test the system-performing device.

The use of forward and backward propagation together provides several advantages. The forward-propagation pass may require shorter time to execute than a backward-propagation pass. Further, the forward-propagation pass provides complete coverage (i.e., generates test vectors for all transitions) in many statecharts. The backward-propagation pass is then used to generate test vectors for transitions unreached during the forward-propagation pass, ensuring complete coverage than the forward-propagation pass alone for many statecharts. The use of both forward and backward propagation may aid the certification of the system-performance device by: (a) ensuring complete coverage for a greater number of statecharts than the use of forward propagation alone and (b) generating test vectors faster than backward-propagation alone. Ensuring complete coverage for a greater number of statecharts in less time aids certification efforts that require complete coverage of all system-performing device requirements.

Along with providing complete coverage, the use of forward and backward propagation may be used to provide a detailed analysis of a statechart, such as the number of transitions reached by forward propagation and/or backward propagation, detection of infeasible guard conditions (i.e., conditions that cannot be satisfied by any choice of values, such as 1>2), unsafe operations such as potentials for divide-by-zero exceptions, range constraints of variables by state, as well as information about the transitions traversed before reaching a backward-reachable transition.

The test generator may also perform checks on the statechart to determine the conformity of a model to statechart guidelines. For example, if a statechart guideline requires each state S in a statechart to have at least one "outgoing" transition (i.e., a transition between two states that starts in state S), the test generator may determine if each state in the statechart is in compliance with the statechart guideline.

An Example Overall System Development Process

FIG. 1 is a flowchart of an example system development process, in accordance with embodiments of the invention. At block 100, a developer identifies a problem (e.g., the need for a particular type of navigation control system of an aircraft) and specifies high-level functional requirements for solving the problem. The high-level functional requirements may segment the solution to the problem into one or more system functions.

The developer correspondingly proceeds with the design of one or more system-design models in block 110, perhaps in collaboration with a team of developers. A result of block 110 may be system-design models that describe a system-performing device (or devices) to perform a system function that partially or wholly solves the problem specified in block 100. The system-performing device may be expressed as computer software to be executed on one or more computer processors. The system-design models may be expressed as statecharts.

In block 120, code may be generated from a statechart representing a system-design model, either manually by the developer or automatically by some computer program capable of realizing the statechart. The Simulink® computer program, perhaps in combination with the Stateflow® computer program, may be used to realize the statechart. The MathWorks, Inc. of Natick, Mass. produces both the Simulink® and the Stateflow® computer programs. Statecharts may be realized in other ways, such as by using other computer programs, as well.

The statechart is verified in block 130, usually according to industry standard objectives like the FAA-mandated DO-178B standard for aviation control systems. Due to the rigor of the certification objectives, block 130 tends to be disproportionately expensive, both in time and in system resources. The DO-178B standard requires complete coverage and does not fully recognize random or pseudo-random generation of test cases. Because existing test generation programs do not generate a complete set of test cases, developers and testers are forced to manually generate test cases that prove the code conforms to the DO-178B standard. Only after complete system testing has been achieved can the system-performing device be certified in block 140. Finally, in block 150, a certified system-performing device can be deployed in industry; for instance, a navigation control system could be incorporated into the avionics of an aircraft.

Example Statecharts

Typically, statecharts are used to define specific behavioral semantics required for parts of a system-performing device, such as sensor controllers, flight controls, engine controls, and navigation systems. These behavioral semantics must be designed to execute repeatedly, over one or more time steps, during the operational life of a system. The purpose of test case generation is to verify that the system-performing device correctly implements the algorithm specified by one or more system-design models.

Figure 2:
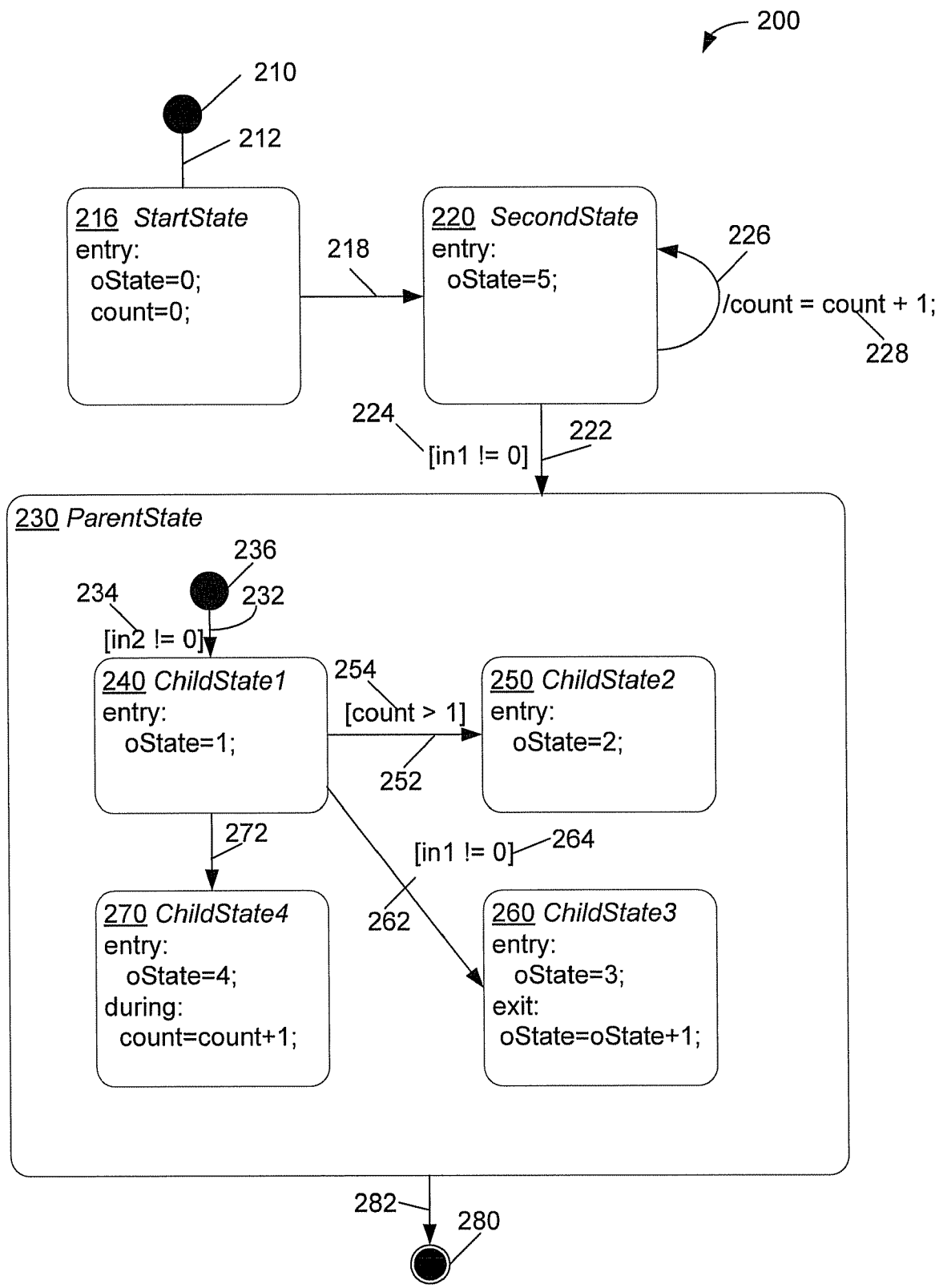
FIG. 2 is an example statechart, in accordance with embodiments of the invention.

FIG. 2 is an example statechart 200, in accordance with embodiments of the invention. As such, the statechart comprises a plurality of states, each of which describe a mode of a system, a plurality of transitions between states, and a plurality of conditions corresponding to the plurality of transitions. FIG. 2 shows statechart 200 with initial states 210 and 236, StartState state 216, SecondState state 220, ParentState state 230, ChildState1 state 240, ChildState2 state 250, ChildState3 state 260, ChildState4 state 270, and final state 280. A state may be named, numbered, or both named and numbered. As shown in FIG. 2, states are named and the names of the states are indicated in an italic font; e.g., StartState.

A state may have one or more "entry actions" and one or more "exit actions." An entry action is an operation performed by the system-performing device when entering a state. FIG. 2 depicts entry actions of a state as following the term "entry:" and before the term "exit:" or the term "during:"; e.g., ChildState3 state 260 performs the entry action of "oState=3;". An exit action is an operation performed when leaving a state. FIG. 2 depicts exit actions of a state as following the term "exit:"—e.g., ChildState3 state 260 has an exit action of "oState=oState+1". Condition and/or transition actions may be specified as actions on transitions (described below).

A state also may have "during actions" that are performed by the object if no outgoing transitions are traversed in response to an event. FIG. 2 depicts during actions of a state as following the term "during:" and before the term "exit:"; e.g., ChildState4 state 270 has a during action of "count=count+1;".

One or more "events" may take place for the system-performing device. An event is a noteworthy occurrence for the system-performing device. Events may trigger transitions between states and the firing of actions. For example, the statechart in FIG. 2 may respond to an event while SecondState state 220 is active by firing the transition 222 or firing the transition 226. Events may be classified as either synchronous (i.e., occurring at a specified time) or asynchronous (i.e., not occurring at a specified time). An asynchronous event also is called a "signal."

For example, suppose a system-performing device is awaiting input from a sensor and, while awaiting input, the system-performing device sends a message upon expiration of a one-minute timer. The expiration of the one-minute timer is a synchronous event. However, if the system-performing device eventually receives input from the sensor, receiving the input from the sensor is an asynchronous event, and so may be called a signal. Signals may be used to model a variety of events, such as error cases (i.e., hardware faults or software "exceptions" generated due to invalid input data or unexpected conditions within the software) and input/output operations (i.e., receive sensor data, a key press, a packet of data, mouse click, or notification of the display a character on a screen). Other events may be modeled as signals as well.

An event may have a event type. An event type indicates a semantic property of the event, such as a source, priority, or timing of the event. For example, an event type may indicate that a value of "5" is from a sensor reading from a air-pressure sensor, a priority of "5" on a 5 point scale of cabin pressure readings, or that the last reading occurred 5 seconds ago.

A state may be what is known as a "parent state" or "composite state." A parent state may comprise two or more parallel or mutually exclusive substates or "child states". FIG. 2 shows ParentState state 230 as a composite state. ParentState state 230 comprises four substates: ChildState1 state 240, ChildState2 state 250, ChildState3 state 260, and ChildState4 state 270. When a state is entered (e.g., a child state) the state and all the state's parent states become active. When a state is exited (e.g., a parent state), the state and all the state's child states become inactive.

Two special states also may be defined. An initial state is an entry (or first) state of the statechart or of a composite state. A final state is an exit (or last) state of the statechart. If an initial state is defined for a statechart, all paths through the statechart must begin at an initial state. If an initial state is defined for a composite state, all paths that enter the composite state must begin at the initial state defined for the composite state. If a final state is defined for a statechart, all paths that exit the statechart must end at a final state. FIG. 2 shows initial state 210 defined as the initial state of statechart 220, initial state 214 defined as the initial state for the composite state of ParentState state 230, and final state 280.

FIG. 2 depicts initial states 210 and 236 as solid circles and final state 280 as a solid circle with a thin surrounding ring. Note that initial state 210 is a statechart initial state while initial state 236 is an initial state of a composite state (ParentState state 230). Other depictions of states, including initial states and/or final states, are possible. Multiple initial states and/or multiple final states may be defined. FIG. 2 shows the example of two initial states 210 and 236.

One or more variables may be defined and used in a statechart to aid modeling the system function performed by the system-performing device. A variable may be defined to store a value. Generally, a variable may be defined to have a type, such as an integer number type, a real number type, a character type, a Boolean type, a string type for a group of characters (e.g. 'abc' is a string of three characters), an array type for a group of integer or real numbers, and so on. A variable may be assigned a value; that is, the variable may be specified with a given quantity or attribute. For example, FIG. 2 shows the assignment of "oState=3;" in ChildState3 state 260, which specifies a value of "3" for the "oState" variable. The type of a variable may limit the values a variable can be assigned. For example, suppose the value of a variable named "Cash" is of a real number type. Then the assignment of "Cash=40.00;" is valid according to the type of the variable Cash, but the assignment of "Cash='abc';" is invalid according to Cash's type, as 'abc' is not a real number. Units may be associated with a value of a variable; e.g., a value of 3 may represent 3 milliseconds, 3 meters, or 3 liters.

Comparisons may be performed on variables, such as determining that a first variable, value, or combination thereof is greater than, greater than or equal to, less than, less than or equal to, equal to, or not equal to a second variable, value, or combination thereof. Comparisons may be used to indicate conditions. For example, condition 254 indicates a comparison of a variable "count" and a value "1" to determine if count is greater than 1. As another example, condition 264 indicates a comparison of a variable "in1" and a value "0" to determine if in1 is not equal to 0.

Comparisons may be performed on event types, such as determining if an event is or is not of a certain type, an event is in or not in a class of events, or if a value of an event is valid for a given event type. For example, if a test generator determines an event of type "keyboard input" and a value of "5" has occurred, the event type may be compared to and match (a) an event type of "keyboard input", (b) a class of events such as "user input", "user input/output operations", or (c) a valid type of input based on the event type of "keyboard input". For the same example, the event type may be compared to and not match: (a) an event type of "display operation complete" or "network input" or (b) a class of events such as "sensor inputs" or "pressure readings".

Variables may be categorized depending on where they are used in the statechart. One or more "statechart-input variables" may be defined and/or set before entry into the statechart and/or during any or all event broadcasts (i.e., notifications of events), one or more "statechart-output variables" may be examined after the effects of any event are determined, and one or more "statechart-defined variables" may be specified at any state of the statechart. For example, FIG. 2 indicates condition 234 includes a variable named "in2" defined as a statechart-input variable. The values of statechart-input variables of a given statechart may come from another source, such as user input, one or more other statecharts coordinating with the given statechart, stored data, or some other source of information. A statechart-input variable may have a default value, if no value is otherwise specified. It is to be understood that the statechart-output variables of a given statechart may comprise all, some, or even none of the statechart-input variables of the given statechart.

In other words, if the system-design model specified by the statechart describes a "black box" system-performing device to perform a system function, and events indicate occurrences that may be classified by type for the black box, the statechart-input variables are specified at or before the occurrence of any event, the statechart-defined variables are used within the black box to perform the system function, the statechart-output variables are examined after the black box is done processing the effects of any event(s) that occurred, All variables have "scope" or visibility within the statechart. The scope of statechart-input and statechart-output variables resides at the level of the statechart. Statechart-defined variables may have scope at the level of the statechart, or may have scope at the level of any state or substate.

A statechart comprises a plurality of transitions, each of which indicates a path from a "source state" to a "destination state". The direction of the transition is from the source state to the destination state (that is, in the direction of the arrow). A transition is said to be traversed in the forward direction if the transition is traversed from the source state to the destination state and the transition is said to be traversed in the backward direction if the transition is traversed from the destination state to the source state.

In the statecharts described herein, transitions are "unidirectional" or one-way; therefore, to model a "bi-directional" or two-way transition between states, two unidirectional transitions (one from source to destination, and one from destination to source) are used. Transition 222 is shown as an arrow with the blunt end of the arrow at SecondState state 220, indicating SecondState state 220 is the source state of transition 222, and the sharp end of the arrow at ParentState state 230, indicating ParentState state 230 is the destination state of transition 222. However, it is possible to have a statechart with bidirectional transitions. Other depictions of transitions are possible.

Transitions are said to have "fired" (i.e., occur or be traversed) when: (1) certain states are active (2) certain events have occurred, (3) events with an event type (or within a class of event types) have occurred, and/or (4) certain conditions are met. A condition is a prerequisite that must be satisfied before traversing the transition, such as a comparison. A condition may be expressed in terms of the statechart-defined variables, the statechart-input variable, the statechart-output variables and/or an event type. As such, a condition may model a requirement of the behavior of the system-performance device. FIG. 2 shows transition 222 with condition 224 of "in1!=0" acting as a prerequisite of determining that variable "in1" is not equal to 0 before transition 224 may be traversed. A condition may also be called a "guard" or a "guard condition". FIG. 2 shows conditions 254 and 264 acting as guard conditions for the transitions leaving a source state of ChildState1 state 240.

A transition may not have a condition and as such, may be traversed even if there are no conditions for the transition. FIG. 2 shows transition 272 without conditions and, as such, may be traversed without satisfying any conditions. A transition without a condition may be traversed once the source state of the transition is reached and an event occurs. For example, FIG. 2 shows that once ChildState1 state 240 is reached, transition 272 may be traversed on the subsequent occurrence of an event to reach ChildState4 state 270.

If a condition utilizes an undefined variable (i.e., a variable that is not a statechart-defined variable, a statechart-input variable, or a statechart-output variable), then there may be a "specification error" in the statechart. Specification errors may be of various types.

Transitions may have priorities. For example, state ChildState1 240 has three outgoing transitions 254, 262, and 272. If the conditions of all these transitions are true, the higher priority transition will fire and the lower priority transition will not fire. Priorities may be assigned using priority rules. An example priority rule is that priorities are assigned to transitions by traveling in a clockwise fashion around a state, with the highest priority transition at a clock-hand position of 12:00. As such, transition 254 has a higher priority than transition 262. Many other priority rules are possible. Priorities may explicitly provided as well; e.g., transition 254 has the lowest priority, transition 262 has a medium priority, and transition 272 has the highest priority. Priorities may be provided using numerical ratings where either lesser or greater numbers mean a higher priority, categorical terms (high, medium, or low), or by other means.

The term "propagating" as used herein means traversing a given transition within the statechart in an "appropriate direction" while carrying forward any values of any variables reached on or before traversing the given transitions and satisfying any condition(s) of the given transition based on the carried-forward values. The term "forward propagation" means the appropriate direction for propagating is the forward direction from a given state (e.g., an initial state). Conversely, the term "backward propagation" means the appropriate direction for propagating is the backward direction from a given state (e.g., the destination state of the given transition).

A "reachable transition" is a transition that may be propagated in the appropriate direction from the given reached state while satisfying any (guard) conditions of the transition. A forward-reachable transition is a transition that may be propagated from the given reached state in the forward direction. Similarly, a backward-reachable transition is a transition that may be propagated the given reached state in the backward direction.

A path may be taken through the statechart. A path through the statechart begins at a starting state, traverses one or more transitions, and ends at an ending state. For example, the path from a starting state of SecondState state 220 to an ending state of ChildState3 state 260 may involve traversing transitions 222, 232, and 262. A path may be open or closed. An open path is a path where the starting state is not the same state as the ending state; conversely, a closed path is a path where the starting state is the same state as the ending state. For example, there is a closed path from SecondState state 220 to SecondState state 220 via transition 226. A statechart may have a cycle. A cycle is a closed path through the statechart with repeated states allowed.

Figure 3:
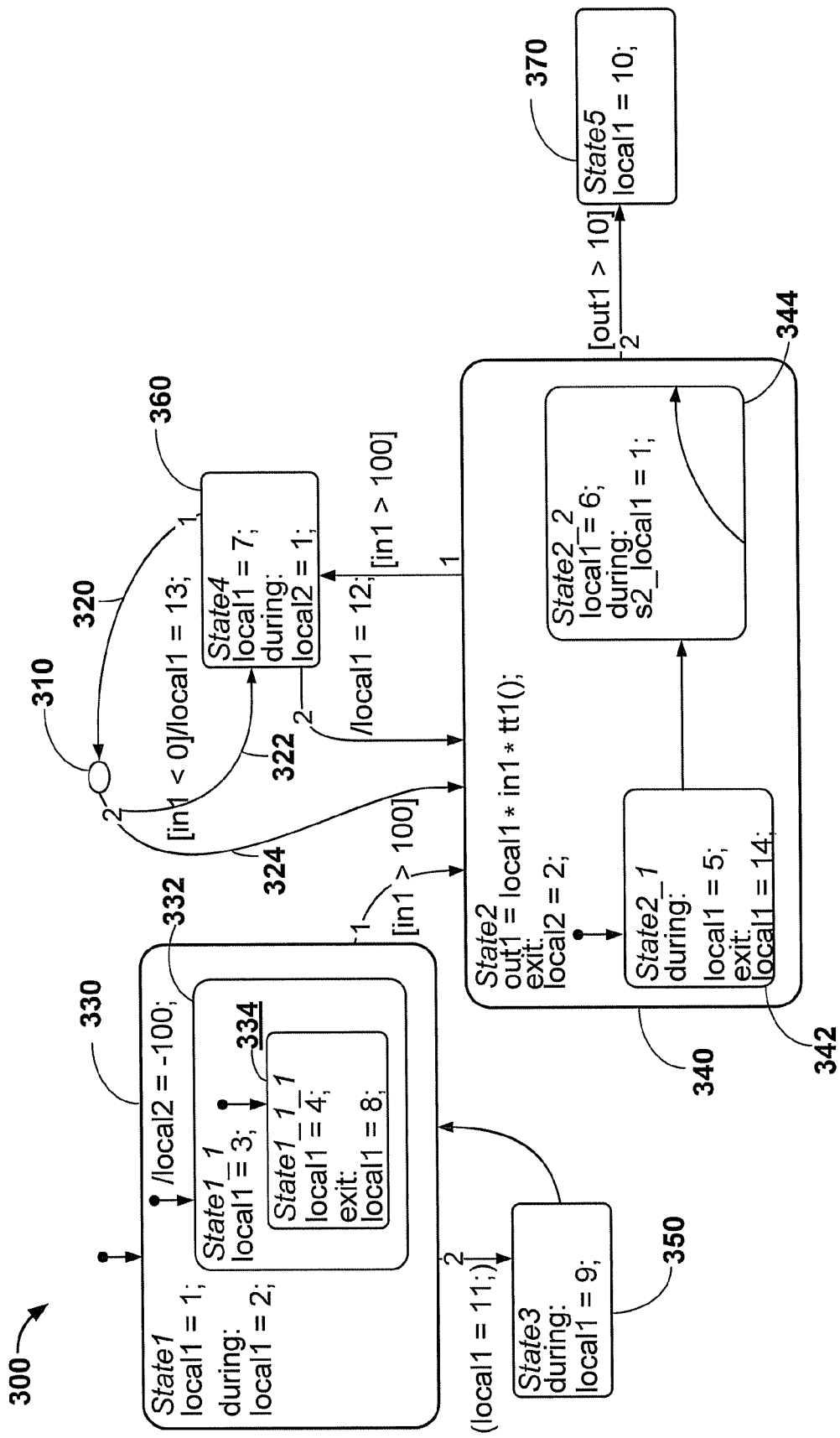
FIG. 3 is an example statechart with a junction, in accordance with embodiments of the invention.

FIG. 3 is an example statechart 300 with a junction 310, in accordance with embodiments of the invention. FIG. 3 shows statechart 300 with states State1 state 330, State1_1 state 332, State1_1_1 state 334, State2 state 340, State 2_1 state 342, State2_2 state 344, State3 state 350, State4 state 360, and State5 state 370, statechart-input variable in1, and statechart-output variable out1. FIG. 3 shows the names of states in statechart 300 indicated in an italic font.

A statechart may comprise one or more junctions. A junction may permit grouping of transitions into a single path without traversing an intervening state. FIG. 3 shows transition 320 entering into junction 310 and transitions 322 and 324 exiting junction 310 without traversing an intervening state, such as states 330-370. FIG. 3 shows junction 310 depicted as a small oval in statechart 300. Other depictions of junctions are possible.

A "transition segment" is a transition that enters into or exits from a junction. FIG. 3 shows transition segment 320 entering into junction 310 and transition segments 322 and 324 exiting from junction 310. A junction may logically join incoming transition segments with outgoing transitions segments. FIG. 3 shows junction 310 logically joining transition segments 320 and 324 into a single logical transition from State4 state 360 to State2 state 340. The same junction 310 also logically joins transition segments 320 to 322 into a single logical transition from State4 state 360 to State4 state 360. Statecharts that contain junctions may have infinite logical transitions if there are cycles present among the transition segments.

Initial states for composite states may also function as junctions. As shown in FIG. 2, initial state 236 functions as a junction between transitions entering into the composite state, such as transition 222, and transitions within the composite state that leave the initial state, such as transition 232.

An Example Computing Device

Figure 4:
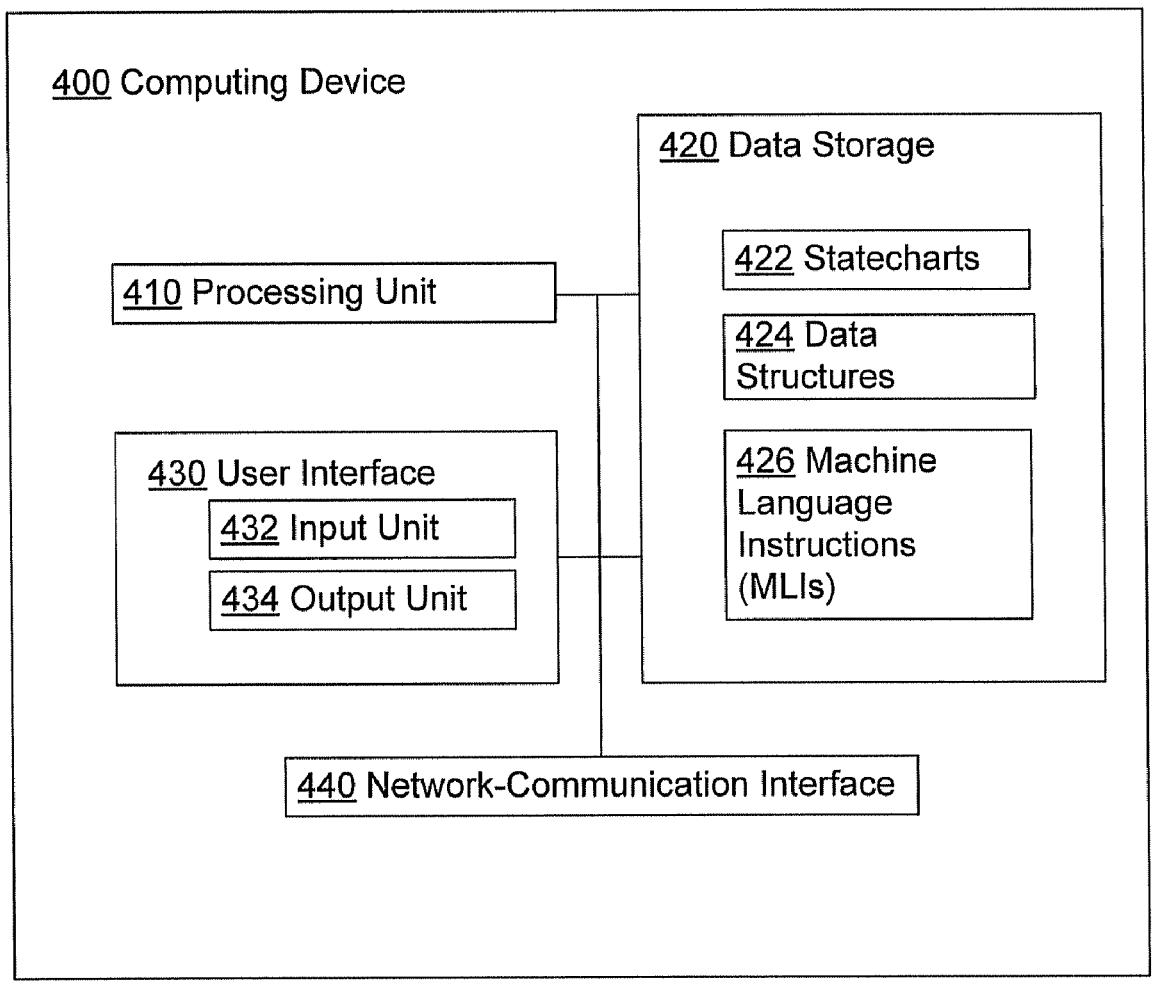
FIG. 4 is an example of a computing device, in accordance with embodiments of the invention.

FIG. 4 is a block diagram of an example computing device 400, comprising a processing unit 410, data storage 420, a user interface 430, and a network-communication interface 440, in accordance with embodiments of the invention. A computing device 400 may be a desktop computer, laptop or notebook computer, personal data assistant (PDA), mobile phone, or any similar device that is equipped with a processing unit capable of executing computer instructions that implement at least part of the herein-described method 600 and/or herein-described functionality of a test generator and/or a test driver.

The processing unit 410 may include one or more central processing units, computer processors, mobile processors, digital signal processors (DSPs), microprocessors, computer chips, and similar processing units now known and later developed and may execute machine-language instructions and process data.

The data storage 420 may comprise one or more storage devices. The data storage 420 may include read-only memory (ROM), random access memory (RAM), removable-disk-drive memory, hard-disk memory, magnetic-tape memory, flash memory, and similar storage devices now known and later developed. The data storage 420 comprises at least enough storage capacity to contain one or more statecharts 422, data structures 424, and machine-language instructions 426. Data structures 424 comprise at any environments, lists, markings of states and/or transitions, vectors (including multi-step vectors and output test vectors), human-readable forms, markings, and any other data structures described herein required to perform some or all of the functions of a herein-described test generator, a herein-described test driver, and/or to perform some or all of the procedures described in methods 600, 700, 800 and/or 900. The machine-language instructions 426 contained in the data storage 420 include instructions executable by the processing unit 410 to perform some or all of the functions of a herein-described test generator, a herein-described test driver and/or to perform some or all of the procedures described in methods 600, 700, 800 and/or 900.

The user interface 430 may comprise an input unit 432 and/or an output unit 434. The input unit 432 may receive user input from a user of the computing device 430. The input unit 432 may comprise a keyboard, a keypad, a touch screen, a computer mouse, a track ball, a joystick, and/or other similar devices, now known or later developed, capable of receiving user input from a user of computing device 400. The output unit 434 may provide output to a user of the computing device 430. The output unit 434 may comprise one or more cathode ray tubes (CRT), liquid crystal displays (LCD), light emitting diodes (LEDs), displays using digital light processing (DLP) technology, printers, light bulbs, and/or other similar devices, now known or later developed, capable of displaying graphical, textual, and/or numerical information to a user of computing device 400.

The network-communication interface 440 is configured to send and receive data and may include a wired-communication interface and/or a wireless-communication interface. The wired-communication interface, if present, may comprise a wire, cable, fiber-optic link or similar physical connection to a wide area network (WAN), a local area network (LAN), one or more public data networks, such as the Internet, one or more private data networks, or any combination of such networks. The wireless-communication interface, if present, may utilize an air interface, such as an IEEE 802.11 (e.g., Wi-Fi) interface to a WAN, a LAN, one or more public data networks (e.g., the Internet), one or more private data networks, or any combination of public and private data networks.

An Example Data Structure for an Environment

FIG. 5 is a schematic view of an example data structure for an environment 500, in accordance with embodiments of the invention. An environment 500 may comprise a set of active states, a set of current values, and/or a multi-step vector to record a "snapshot" of the statechart. The snapshot of the statechart is a collection of all values required to reach a state of interest in a statechart as well as the path taken to reach the state of interest. FIG. 5 shows environment 500 with set of active states 510, set of current values 520, and multi-step vector 530. Set of active states 510 may comprise one or more states that are currently active. Set of current values 520 may comprise values for one or more statechart-input, statechart-output and/or statechart-defined variables. Each of the values for the one or more statechart-input, statechart-output and/or statechart-defined variables may comprise one or more scalar values, one or more ranges of values, and/or a combination of scalar value(s) and range(s) of values.

A multi-step vector may represent an ordered list of steps, where each step has active states and values, through the statechart. To represent the ordered list of steps, a multi-step vector may comprise a prior-state list, a prior-transition list, and/or a set of previous states to record a path through a statechart. FIG. 5 shows multi-step vector 530 with prior-state list 532, prior-transition list 534, and set of previous states 536. Prior-state list 532 may comprise one or more states previously reached in a path through a statechart. If prior-state list 532 is empty, the path represented by environment 500 may not have previously reached any states; i.e., environment 500 represents an initial state. Prior-transition list 534 may comprise one or more transitions previously traversed in a path through a statechart. If prior-transition list 534 is empty, the path represented by environment 500 may not have previously traversed any transitions; i.e., environment 500 represents an initial state.

The set of previous values 536 may comprise one or more variable values for each of one or more variables. The set of previous values may comprise variable values for statechart-input, statechart-output and/or statechart-defined variables. Each of the variable values of the one or more statechart-input, statechart-output and/or statechart-defined variables may comprise one or more scalar values, one or more ranges of values, and/or a combination of scalar value(s) and range(s) of values. Each variable value in the set of previous values 536 may be associated with a duration. The association between the variable value and the duration may indicate that a variable had the variable value for a number of subsequent events as indicated by the duration.

A "don't care" value may be specified for a variable if any possible value of the variable could be used to satisfy all conditions for transitions propagated in reaching the active state. Specifically, a don't care value may be used if (a) an statechart-input or statechart-defined variable has not been read in the current timestep before reaching the active state, (b) a statechart-output variable has not been set before reaching the active state, (c) a statechart-output variable has been set to statechart-input or statechart-defined variable with a "don't care" value before reaching the active state or (d) a statechart-output variable has been set to a value returned by a function invoked with a statechart-input or statechart-defined value that has a "don't care" value before reaching the active state. Alternatively, the set of current values 520 and/or set of previous values 536 may specify only the variables read and/or set and their values upon reaching the active state.

The value of statechart-input variables revert to "don't care" immediately before the firing of the next event, while the values of statechart-output and statechart-defined variable retain their values across events unless they are specifically assigned new values by applicable entry, exit, during, or transition actions (e.g., output1=3).

Table 1 provides an example record of values in a statechart. For this example, suppose a statechart-input variable named "TempIn" is initially set to a value of "37" just prior to entry to State1 of a statechart and that the statechart also comprises a statechart-defined variable named "Local1". For the duration of the first time step (i.e., immediately following the firing of a single event), the value of TempIn is 37 and the value of Local1 is "don't care" as shown in Row 1 of Table 1 below. Next, assume a path through the statechart is taken from State1 to State 2, where Local1 is set to a value of "ABC". In response to the firing of the next four events, no transitions are fired for this example and the values of TempIn and Local1 do not change. Hence, Row 2 of Table 1 indicates a duration of five where the value of TempIn is "don't care" and Local1 is "ABC". Next, TempIn is set to a value of "40" preceding the next event, which causes a transition from State2 to State3. In State 3, Local1 is set to a value of "DEF". Row 3 shows the values of the variables once in State 3. No transition fires during the next event, so TempIn has a "don't care" value and Local1 remains "DEF" as shown in Row 4.

TABLE 1

| Row | Variable | Variable 1 Value | Variable 2 | Variable 2 Value | Duration |
| --- | --- | --- | --- | --- | --- |
| 1 | TempIn | 37 | Local1 | Don't care | 1 |
| 2 | TempIn | Don't care | Local1 | ABC | 5 |

TABLE 1-continued

| Row | Variable | Variable 1 Value | Variable 2 | Variable 2 Value | Duration |
|---|---|---|---|---|---|
| 3 | TempIn | 40 | Local1 | DEF | 1 |
| 4 | TempIn | Don't care | Local1 | DEF | 1 |

A value of a variable may be specified as a scalar value (e.g., A=4), as a range of values, or a combination of a scalar value and a range of values. A range of values may be written as "[a,b]", where the range when written with brackets includes the endpoint-values "a" and "b" as well; for example, "A=[6,9]" is an expression that A may be any value within the range of 6 through 9, inclusive of values 6 and 9. The expression "A=4, [6,9]" is an example of a combination of a scalar value and a range of values that state that A may be a value of either 4 or a value in the range of 6 to 9, inclusive.

If the range does not include the endpoint-values, the range may be written with parenthesis such as "(a,b)"; for example "A=(6,9)" is an expression that A may be any value between 6 and 9 but not including either 6 or 9. As no number can exceed infinity, ranges involving the value infinity typically are written with parentheses for the portion of the range involving infinity; for example "A=[0,∞]" is an expression that A may be any value greater than or equal to 0 and "B=(−∞, ∞)" is an expression that B may be any non-infinite number.

The test generator may use interval mathematics and range analysis during the forward and backward-propagation passes. The use of range analysis permits the examination of statecharts at a higher semantic level by permitting the statechart to be divided into equivalence classes based on intervals. For example, if a variable A is set to 1 in a statechart, all "downstream" states have a constraint that A=1. In another example, if a test is made in a statechart to determine if another variable B is greater than 0, this constraint can be thought of in terms of two ranges: the range where B is less than or equal to 0, or B=(−∞, 0], and the range where B is greater than 0, or B=(0,∞).

By performing operations on ranges, debugging of source code derived from the statechart is aided by automatically catching errors such as possible or actual division by 0, underflow, and overflow errors. The use of ranges may aid determination of transitions that are impossible to traverse. For example, if a range of a variable C is [2,4] while a state S is active and an outgoing transition from state S has a condition of "C>5", the transition is impossible to traverse as the condition cannot be met by any value in the range of C. Further the determination of C as being in the range [2,4] permits the creation of three equivalence classes for the values of C: an equivalence class where C is (−∞, 2), an equivalence class where C is [2,4], and an equivalence class where C is (4, ∞).

The use of equivalence class reasoning and interval mathematics may significantly improve the performance of test generation. The use of interval mathematics allows complex conditions that are comprised of multiple variables combined via mathematical, logical, or relational operators to be efficiently analyzed. The dissertation of R. E. Moore entitled "Interval Arithmetic and Automatic Error Analysis in Digital Computing", incorporated herein by reference, explains how arithmetic operators can be applied to intervals (i.e., ranges) to compute the resultant ranges. R. E. Moore, "Interval Arithmetic and Automatic Error Analysis in Digital Computing" (Department of Mathematics, Stanford University) (November 1962), available at http://interval.louisiana.edu/Moores_early_papers/disert.pdf.

A Method for Generating Test Vectors

Figure 6:
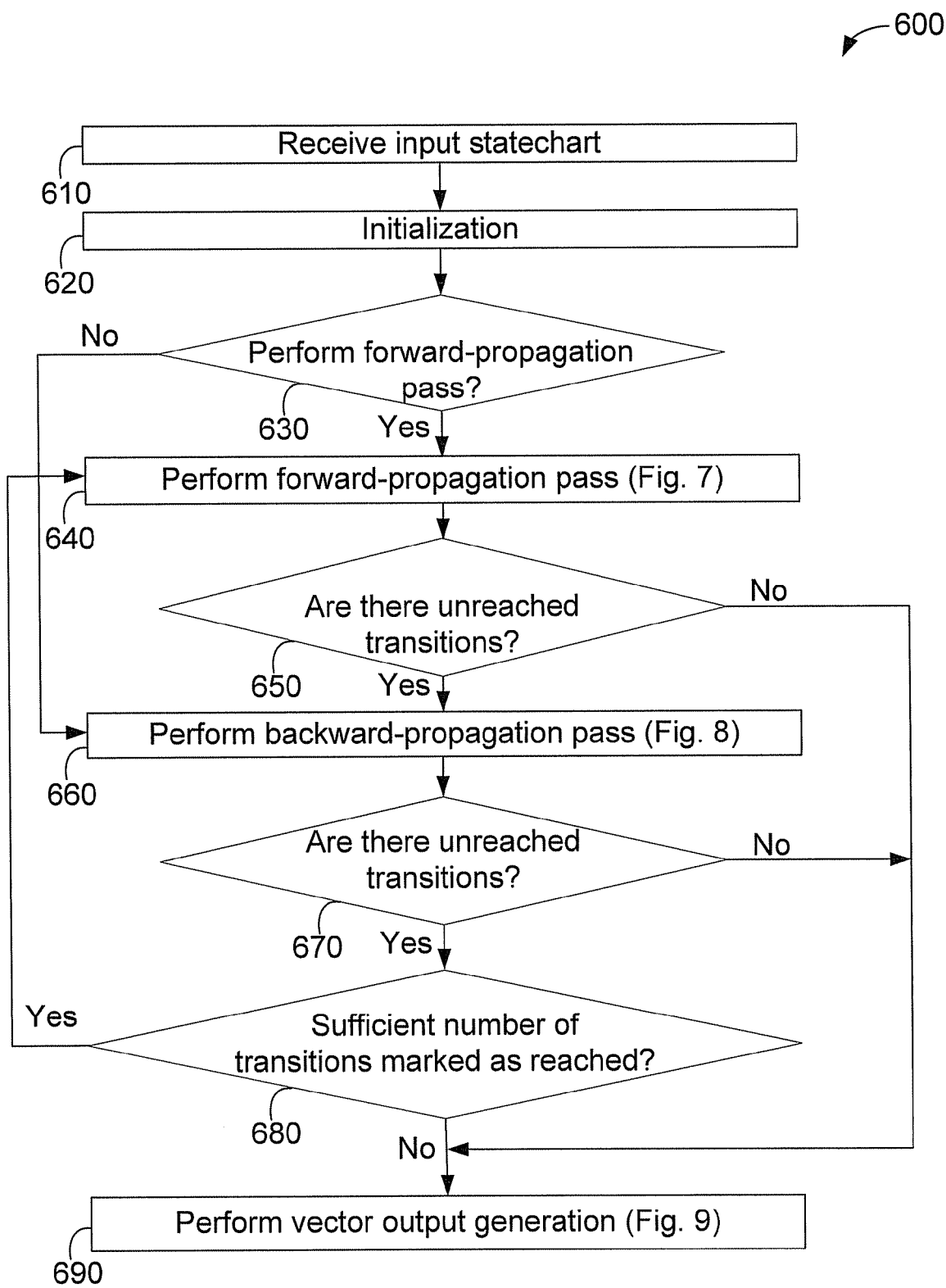
FIG. 6 is a flowchart of an example method for generating test vectors for a statechart, in accordance with embodiments of the invention.

FIG. 6 is a flowchart of an example method 600 for generating test vectors for a statechart, in accordance with embodiments of the invention. The method 600 may be performed by a test generator, a test driver, a combination test generator and test driver, and/or one or more other entities not described herein, without departing from the scope and spirit of the present invention.

It should be understood that each block in this flowchart and within other flowcharts presented herein may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments. In particular, the herein-described forward-propagation pass may be performed independently of the herein-described backward-propagation pass.

Turning to FIG. 6, at block 610, the test generator may receive an input statechart. The input statechart may comprise a system-design model. The input statechart may be received via a communication interface, such as network-communication interface 440. The input statechart may be received via user interface 430. The input statechart may be created using a graphical user interface (GUI) provided by the Simulink® computer package or the Microsoft Office Visio® software package. The input statechart may comprise a plurality of states and a plurality of transitions. One or more states in the plurality of states may be identified as initial states, and one or more states in the plurality of states may be identified as final states. Each transition in the plurality of transitions may have one or more conditions associated with the transition.

At block 620, the test generator may be initialized. Initialization of the test generator comprises marking all states and all transitions in the input statechart as unreached. Also, additional data structures, such as environments, environment lists, timestep-sequence-data objects, sequence lists, and/or an unreached-transition list, may be initialized as well. The environment list may be initialized to be empty, and the unreached-transition list may be initialized to include the environments generated for each transition in the statechart. User input may be requested to initialize the test generator; for example, user input may be requested to initialize a maximum depth value.

In particular, an environment, such as environment 500, may be generated for each transition in the statechart, wherein a set of active states 510 may be initially null, a set of current values 520 may indicate a "don't care" value for each statechart-input, statechart-output, and/or statechart-defined variable, the prior-state list 532 and the prior-transition list 534 may be set to be empty. The set of previous values 536 may indicate a "don't care" value for each statechart-input, statechart-output, and/or statechart-defined variable.

At block 630, the test generator may determine if a forward-propagation pass is to be performed. If the forward-propagation pass is to be performed, the test generator proceeds to block 640. If the forward-propagation pass is not to be performed, the test generator proceeds to block 660.

Upon reaching block 640, the test generator may perform a forward-propagation pass. A forward-propagation pass may comprise some or all of the herein-described procedures of method 700.

Figure 7:
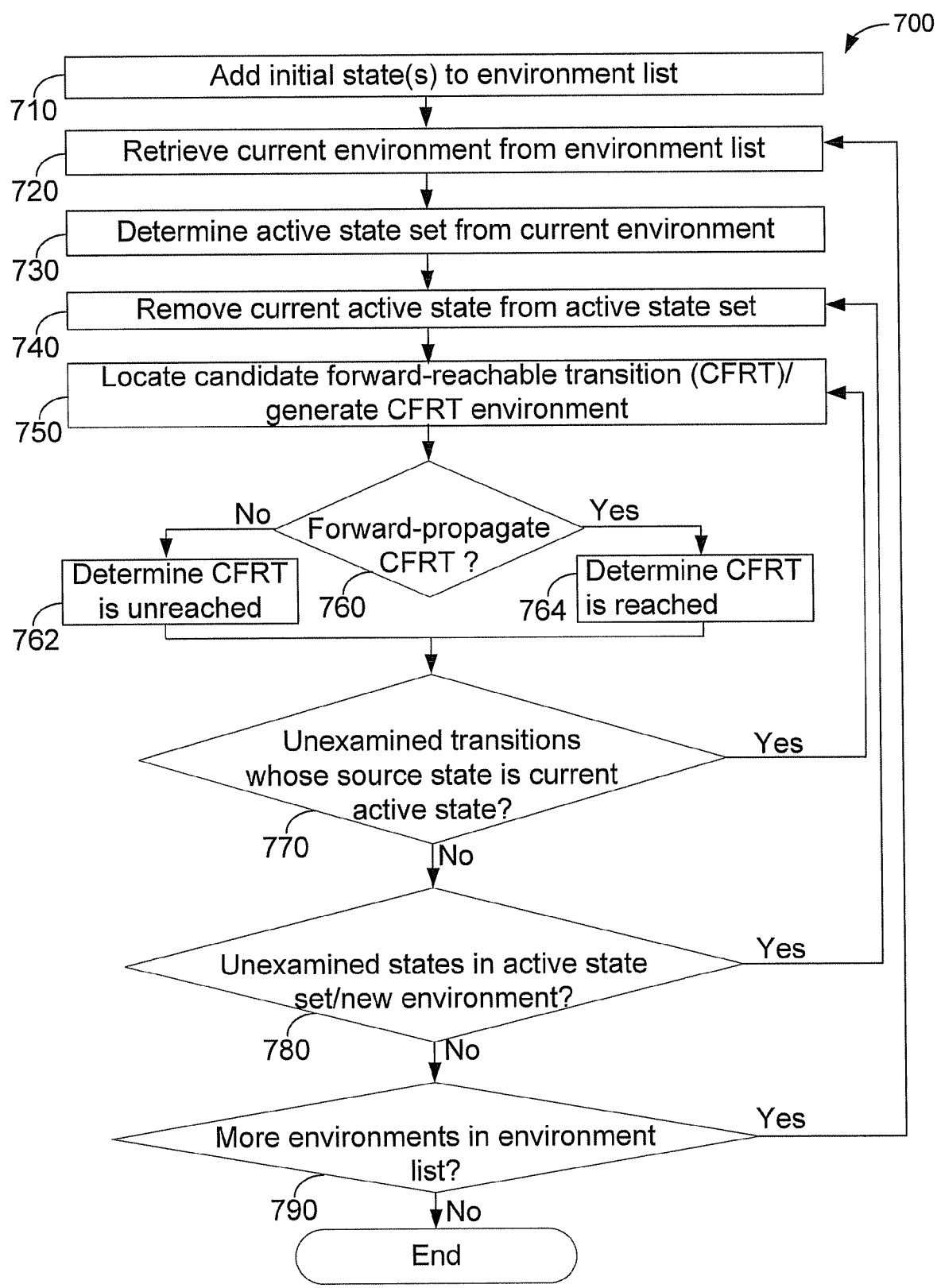
FIG. 7 is a flowchart of an example method for performing a forward-propagation pass, in accordance with embodiments of the invention.

FIG. 7 describes an example method 700 for performing a forward-propagation pass, in accordance with embodiments of the invention. Method 700 begins at block 710.

At block 710, the test generator may add each initial state of the statechart to the environment list. The test generator may generate and store an environment 500 for each initial state of the statechart in the environment list. Set of active states 510 may include a state currently being examined by the test generator; in the case of an initial state, set of active states 510 may be the initial state. Set of current values 520 may comprise a value for each of the one or more statechart-input, statechart-output, and/or statechart-defined variables read or set in the active state and/or by a transition into or out of the active state. In the case of an initial state, both the prior-state list 532 of multi-step vector 530 and the prior-transition list 534 of multi-step vector 530 may be set to be empty.

The set of current values 510 and/or set of previous values 536 may comprise values and/or ranges associated with any or all of the statechart-input and statechart-output variables.

At block 720, the test generator may use a traversal technique (e.g., depth-first or breadth-first search) to select an environment from the environment list. The current-environment (CE) pointer is set to reference the selected environment. The organization of the environment list may depend on the traversal technique used (i.e., a depth-first search traversal technique may organize the environment list as a stack). Once an environment is selected, the selected environment may be marked as "examined".

At block 730, the test generator may determine an active state set. The active state set may be determined by copying the set of active states 510 of the selected environment.

At block 740, the test generator may remove the current active state from the active state set. This state is considered the current-active-state. Selection of the current-active-state from the active state set may be random or may be ordered. Example orderings include selecting all child states before their parents, or vice versa. Other orderings are possible as well.

At block 750, the test generator may locate an "unexamined" transition whose source state is the current active state; that is, the test generator locates a candidate forward-reached transition (CFRT). A transition may be determined to be unexamined if the transition has not been determined as either "reached" or "unreached". The test generator can determine a transition is unexamined by maintaining both a reached-transition list and an unreached-transition list. A transition may be determined to be an unexamined transition if the transition is neither in the reached-transition list nor in the unreached-transition list. Alternatively, the test generator may use an indicator for each transition to track that the transition as reached, unreached, or unexamined.

In another embodiment of the invention, an unreached-state list and a reached-state list may be used to perform the functions of the unreached-transition list and reached-transition list, respectively. The test generator can determine a state is unexamined by maintaining both a reached-state list and an unreached-state list. A state may be determined to be an unexamined state if the state is neither in the reached-state list nor in the unreached-state list.

The test generator may generate a candidate environment based on the selected environment. For example, the test generator may generate the candidate environment by copying the selected environment via the CE pointer. Other methods of generating the candidate environment are possible as well.

At block 760, the test generator may determine the CFRT can be forward propagated. The CFRT may be forward-propagated if the following three conditions are all true:

(1) the source state of the CFRT is in the active state set, (2) the conditions of all transitions of higher priority of the CFRT, including transitions out of parallel, parent, or child states, may be invalidated using values of the statechart-input, statechart-output, and/or statechart-defined variables stored in the set of current values of the candidate environment combined with any legal values of any unread statechart-input variables in the candidate environment, and (3) all condition(s) associated with the CFRT may be satisfied using values of the statechart-input, statechart-output, and/or statechart-defined variables stored in the set of current values of the candidate environment combined with any legal values of any unread statechart-input variables in the candidate environment.

The term "combined constraint" is used herein to describe the conjunction of conditions (2) and (3) above.

The test generator may determine the CFRT can be forward propagated by performing one or more of the following procedures:

(a) The test generator may determine the combined constraint of the CFRT can be met based on the values stored in the candidate environment.

(b) The test generator may determine the combined constraint of the CFRT can be met based on constraining and/or "further constraining" of one or more statechart-input variables stored in the active state of the candidate environment. Also, the one or more statechart-input variables in the active state of the candidate environment may be updated to reflect the associated constrained or further constrained values.

A value may be constrained by using interval mathematics and interval logic to decrease the interval. A value may be further constrained to a smaller interval or a single value as long as the entire constrained value, after being further constrained, is still contained within the original value. Therefore, single values cannot be further constrained. A "don't care" value may be treated as an unconstrained value. Note that a value may be further constrained to include only interval(s) and/or a single value(s).

For example, a "don't care" value for variable x could be constrained to the interval (100, infinity) to enable the condition x>100. Then, the interval (100, infinity) on x could be further constrained to [200, 300] to enable the condition $200 \leq x \leq 300$, to the single value 365 to enable the condition x=365, or the combination of [200, 300] and 365 to enable the condition of (($200 \leq x \leq 300$) or (x==365)).

(c) The test generator may determine the combined constraint of the CFRT can be met based on possible actions in one or more states active in the candidate environment. For example, the test generator may remain in an active state after an event is fired so that the during action of the state is executed to determine if the combined constraint can be met. Also, the candidate environment may be updated to reflect the possible actions taken to allow the CFRT to be traversed in the one or more states active in the candidate environment. The possible actions may include broadcasting an event to the given environment and/or other environments maintained by the test generator.

(d) A combination of changing statechart-input variable values as described in procedure (b) and taking possible actions in one or more states as described in procedure (c) may be used to determine the combined constraint of the CFRT can be met and thus forward propagate the CFRT.

Otherwise, the test generator may determine the CFRT cannot be forward propagated.

If the CFRT cannot be forward propagated, the test generator proceeds to block 762. If the CFRT can be forward propagated, the test generator proceeds to block 764.

At block 762, the test generator may determine the CFRT cannot be forward propagated and thus, the CFRT is not a forward-reached transition. To determine if the CFRT cannot be propagated, the test generator may analyze the combined constraint to determine if the combined constraint is "feasible" or "infeasible". A feasible constraint is a constraint that may be satisfied with a chosen value or set of values, e.g., the constraint (x>100) may be satisfied if x is chosen to exceed 100. An infeasible constraint is a constraint that is not feasible; e.g., ((x==1) AND (x==2)). If the combined constraint is infeasible, the test generator may report a specification error. The test generator then proceeds to block 680. If no specification errors are reported, the candidate environment may be discarded.

At block 764, the test generator may determine the CFRT may be forward propagated and thus, that the CFRT is a forward-reached transition. If the candidate environment was not previously removed from the unreached-transition list, the candidate environment may be removed from the unreached-transition list.

The test generator may remove the current active state from the set of active states 510 in the candidate environment and add the destination state of the CFRT to the set of active states 510 in the candidate environment. The test generator may add the current active state to the prior-state list 532 of the candidate environment. The prior-transition list 534 of the candidate environment may be updated to include the CFRT. The test generator may copy the set of current values 520 in the candidate environment to the set of previous values 536 of the candidate environment. Then, the test generator may update the current set of values 520 in the candidate environment based on actions in the destination state. The test generator may add the candidate environment to the environment list.

At block 770, the test generator may determine if there are any unexamined transitions whose source state is the current active state. If any transition from the current active state is unexamined, the test generator returns to block 750. If all transitions from the current active state have been examined, then the test generator may proceed to block 780.

At block 780, the test generator may determine if there are any active states in the active-state set and/or candidate environment whose transitions are unexamined. The test generator may also examine the candidate environment for active states as well. If there are any active states in the candidate environment and/or in the active-state set whose transitions are unexamined, the test generator may proceed to block 740. If there are no active states in the candidate environment whose transitions are unexamined, the test generator may proceed to block 790.

At block 790, the test generator determines if there are more environments in the environment list to be examined. One technique for determining that all environments in the environment list are examined is to determine that all environments in the environment list have been marked as examined; however, other techniques are possible as well. If all environments in the environment list have been examined, the test generator may determine the forward-propagation pass is complete. If all environments in the environment list have not been examined, the test generator may proceed to block 720.

As an example of the forward-propagation pass using the statechart of FIG. 2, at block 720, the test generator may add initial state 210 of statechart 200 to the environment list by generating an environment for initial state 210 and adding the environment to the environment list.

For example, at block 720 the test generator may generate an environment 500 of initial state 210 with: the set of active states 510 set to initial state 210, the set of current values 520 and the set of previous values 536 set to "don't care" values for all statechart-input, statechart-output and statechart-defined variables in statechart 200, the prior-state list 532 of multi-step vector 530 and the prior-transition list 534 of multi-step vector 530 set to be empty.

Assume the environment for initial state 210 was selected from the environment list and the CE pointer was set to reference the selected environment at block 720, an active state set with initial state 210 was determined at block 730, and that initial state 210 was removed the active state set at block 740.

In block 750, transition 212 may be identified as a CFRT, as transition 212 is the only transition in statechart 200 whose source state is initial state 210. The test generator may generate a candidate environment (for transition 212) by copying the selected environment, perhaps via the CE pointer.

In block 760, the CFRT (transition 212) may be forward propagated as there are no conditions to be satisfied to be traversing transition 212 and there are no higher priority transitions. In block 764, a candidate environment may be updated by first copying the source state of the CFRT to the prior-state list 532 of the multi-step vector 530, and setting the set of active states 520 equal to the destination state of the CFRT. The candidate environment may be updated by removing initial state 210 from the set of active states 510 and adding StartState state 216 to the set of active states 510, adding initial state 210 to the prior-state list 532 of multi-step vector 530, adding transition 212 to the prior-transition list 534, and copying the set of current values 520 from the selected environment to the set of previous values 536 of the candidate environment. The set of current values 520 of the selected environment may be updated with entry actions in StartState state 216, such as entry actions of "oState=0" and "count=0".

In block 770, the test generator determines that all transitions (e.g., transition 212) from initial state 210 have been examined. Thus there are no unexamined transitions and the test generator proceeds to block 780. In block 780, the test generator determines there are more active states in the active state set and/or candidate environment (e.g., StartState state 216) and returns to block 740.

As transitions are marked as reached or unreached the first time they are reached during the forward-propagation pass, each transition may be traversed only once during the forward-propagation pass. If each transition is traversed only once during the forward-propagation pass, at most one iteration of a cycle in the statechart may be propagated. Therefore, the forward-propagation pass may not reach certain transitions in the statechart; for example, due to a condition that specifies a certain number of cycles occur in the path before the transition may be traversed.

As an example, condition 254 indicates that transition 252 will only be traversed if a variable "count" exceeds one. Upon examination of statechart 200, the variable "count" may be incremented via a transition action of transition 226. FIG. 2 shows the transition action 228 of transition 226 to be "/count=count+1;" Therefore, to have "count" exceed one and thus satisfy condition 254, there is a requirement that at least two cycles that involve traversing transition 226 (i.e., as "count" is initialized to 0 as an entry action to StartState state 216, the first cycle would execute transition action 228 to increment "count" to one, the second cycle would execute transition action 228 to increment "count" to two, and thus satisfy condition 254). A forward-propagation pass may determine that a transition with a condition requiring a certain number of cycles of a statechart are traversed is not forward propagated. For example, condition 254 is not forward propagated since no environments in the environment list ever fired transition 226 twice before leaving SecondState state 220.

Returning to FIG. 6, at block 650, the test generator determines if there are unreached transitions. The test generator may determine there are unreached transitions by determining that the unreached-transition list is not empty. If there are no unreached transitions (i.e., the unreached-transition list is empty), the backward-propagation pass will not be executed and the test generator proceeds to block 690. If there are unreached transitions, the test generator proceeds to block 660.

Upon reaching block 660, the test generator may perform a backward-propagation pass. A backward-propagation pass may comprise some or all of the herein-described procedures of method 800.

Figure 8:
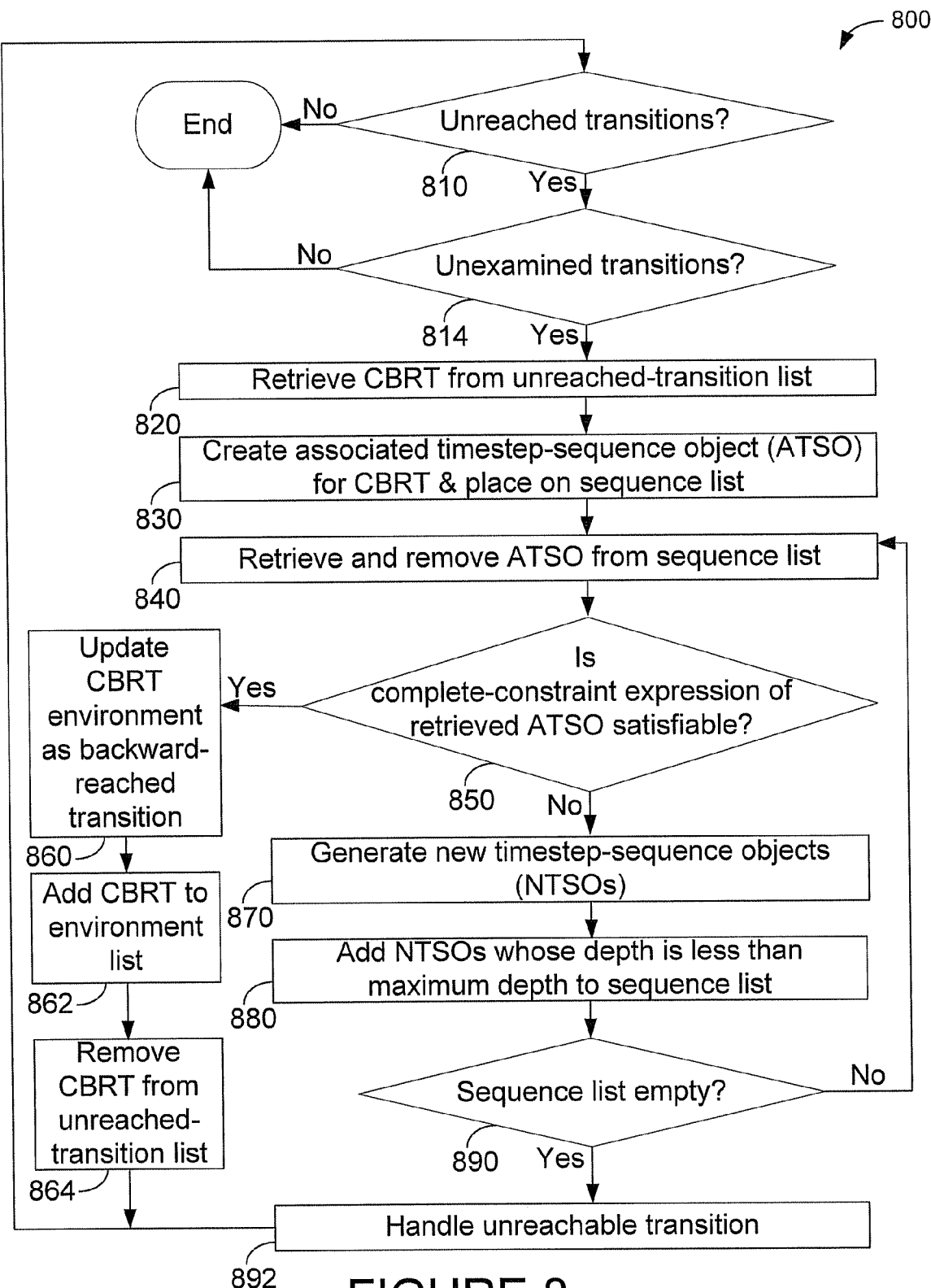
FIG. 8 is a flowchart of an example method for performing a backward-propagation pass, in accordance with embodiments of the invention.

FIG. 8 is a flowchart of an example method 800 for performing a backward-propagation pass, in accordance with embodiments of the invention.

Method 800 begins at block 810. At block 810, the test generator determines if there are unreached transitions. The test generator may determine there are unreached transitions by determining that the unreached-transition list is not empty. If there are no unreached transitions (i.e., the unreached-transition list is empty), the backward-propagation pass is complete. If there are unreached transitions, the test generator proceeds to block 814.

At block 814, the test generator determines if there are unexamined transitions in the unreached-transition list. The test generator may use a common unreached-transition list for both the forward-propagation pass and the backward-propagation pass. As such, the test generator may communicate results between the forward-propagation pass and the backward-propagation pass via the common unreached-transition list. Another technique to communicate results between the forward-propagation pass is to use a common environment list for both the forward-propagation pass and the backward-propagation pass. Note that both a common unreached-transition list and a common environment list may be used in both the forward-propagation pass and the backward-propagation pass.

Then, one technique to utilize the backward-propagation pass separately from the forward-propagation pass is to create an unreached-transition list at block 814 and initialize the unreached-transition list to include all transitions of the input statechart. Additional initialization of the backward-propagation pass may be performed at block 814 as well, including creation of an environment list.

The test generator may determine there are unexamined transitions in the unreached-transition list by determining if there are any transitions on the unreached-transition list that are not on the examined-transition list. If there are unexamined transitions, the test generator proceeds to block 820. If there are no unexamined transitions, the backward-propagation pass is complete.

At block 820, the test generator may retrieve a candidate backward-reachable transition (CBRT) from the unreached-transition list. The test generator may retrieve a CBRT by retrieving a CBRT environment from the unreached-transition list. A CBRT environment may be retrieved by setting a CBRT pointer to reference the retrieved CBRT environment. Other retrieval techniques are possible as well.

At block 830, the test generator may create an associated timestep-sequence object (ATSO) for the CBRT and place the ATSO on a sequence list. A timestep-sequence object represents the results of one or more subsequent events (e.g., the result may represent the case in which a particular transition is fired or the case in which no transition is fired). A timestep-sequence object may comprise a "complete-constraint expression". A complete-constraint expression may comprise information about one or more conditions, including combined conditions, required to be met to ensure the results represented by the timestep-sequence object are performed.

A timestep-sequence object may comprise a subsequent timestep-sequence pointer. The subsequent timestep-sequence pointer may represent results of one or more subsequent events. A timestep-sequence object may have a subsequent timestep-sequence pointer that references another timestep-sequence object whose subsequent timestep-sequence pointer references another timestep-sequence object, and so on. Then, the complete-constraint expression of a timestep-sequence object may be comprised of a conjunction of the combined constraint of the timestep-sequence objection and any unresolved constraint expressions from timestep-sequence objects referenced via the subsequent timestep-sequence pointer of the timestep-sequence object.

Initially, the subsequent timestep-sequence pointer may indicate there are no subsequent events (i.e. the subsequent timestep-sequence pointer is null) and the complete-constraint expression may comprise only the combined constraint of the CBRT.

The depth of a timestep-sequence object may be defined as: (a) one, if the subsequent-timestep sequence pointer indicates there are no subsequent events, or (b) the depth of the timestep-sequence object pointed to by the subsequent timestep-sequence pointer plus one. For example, if a depth of a timestep-sequence object pointed to by the subsequent timestep-sequence pointer of the timestep-sequence object is 2, the depth of the timestep-sequence object is 2+1=3.

At block 840, the test generator may retrieve an ATSO from the sequence list. Once retrieved, the retrieved ATSO may be removed from the sequence list as well.

At block 850, the test generator may determine if the complete-constraint expression of the retrieved ATSO can be satisfied. The test generator may determine the CBRT is a "backward-reached" transition (i.e., a transition that may be reached via a backward-propagation pass) by determining the complete-constraint expression can be satisfied. The test generator may determine the complete-constraint expression can be satisfied by attempting to test the values in any environment on the environment list to see if values in an environment may satisfy the complete-constraint expression. As well as testing values in the environments of the environment list, the test generator may attempt to further constrain one or more statechart-input variables to values that satisfy the complete-constraint expression. If the test generator determines the complete-constraint expression of the retrieved ATSO can be satisfied, the test generator may proceed to block 860. If the test generator determines the complete-constraint expression of the retrieved ATSO cannot be satisfied, the test generator may store the portion of the complete-constraint expression that could not be resolved and proceed to block 870.

At block 860, the test generator may generate the CBRT environment; the test generator may make a copy of the environment from the environment list that was used to satisfy the complete-constraint expression. The test generator may further constrain the values of the statechart-input variables of the CBRT environment as required to satisfy the complete-constraint expression. The test generator may update the set of previous values in the multi-step vector of the CBRT environment with values from the environment used to satisfy the complete-constraint expression. The prior-state list of the multi-step vector of the CBRT environment may be updated to add states reached to satisfy the complete-constraint expression. The prior-transition list of the multi-step vector of the CBRT environment may be updated to add any transition(s) traversed to satisfy the complete-constraint expression.

At block 862, the test generator may add the CBRT environment to the environment list. The added CBRT environment may then be used to determine the satisfiability of any other unreached transitions in the unreached-transition list.

At block 864, the test generator may remove the CBRT from the unreached-transition list, if not done previously. After performing the actions of block 864, the test generator may proceed to block 810.

At block 870, the test generator may generate one or more new-timestep-sequence objects (NTSOs). The test generator may generate each NTSO by first generating a previous-feasible-timestep-sequence object. A previous-feasible-timestep-sequence object is a timestep-sequence object that represents at least one action taken over at least one timestep prior to the current step. Example actions taken at least one timestep prior to the current step are: (a) a traversal of a transition or (b) an action performed within a state (e.g., a "during" action).

The unresolved constraint of the ATSO may be determined. The unresolved constraint of the ATSO may be determined by simulating the effects of the action that the ATSO represents (e.g., the effects of firing a particular transition in response to an event or the effects of not firing any transition in response to an event) and applying the simulated effects to the complete-constraint expression of the ATSO.

For example, let the complete-constraint expression of the ATSO be ((a==1) AND (b==2) AND (c>7)). Further assume the effects of simulating the associated action are to execute a transition action that sets the variable a to the value of one. Then, the unresolved constraint would be computed by replacing the variable a in the complete-constraint expression with the value of one and then simplifying the expression. For example, (1==1) AND (b==2) AND (c>7) would be simplified to (b==2) AND (c>7). Therefore, the unresolved constraint is (b==2) AND (c>7). The sub-condition a==1 is no longer "unresolved" because that portion of the constraint has been satisfied. The unresolved constraint associated with the ATSO is added to each previous-feasible-timestep-sequence object.

Once a previous-feasible-timestep sequence is generated, its subsequent sequence pointer is set to reference a copy of the ATSO.

At block 880, the test generator may add one or more NTSOs to the sequence list if a depth of a NTSO is less than a maximum depth. The test generator may examine each NTSO and determine a depth of the NTSO.

If the depth of the NTSO exceeds the maximum depth value, the NTSO may be discarded and, as such, not added to the sequence list, thereby constraining the search for the CBRT to only use a maximum depth of timesteps. However, if the depth of the NTSO does not exceed the maximum depth value, the new-timestep-sequence object may be added to the sequence list.

At block 890, the test generator may determine if the sequence list is empty. If the sequence list is empty, the test generator may proceed to block 892. If the sequence list is not empty, the test generator may proceed to block 840.

At block 892 the test generator may handle the CBRT as an unreachable transition; i.e., the CBRT is not a backward-reached transition using the backward-propagation pass. The test generator may handle an unreachable transition by: (1) waiting to examine the unreachable transition again after other transitions have been reached, (2) generating an error message for a specification error indicating an unreachable transition, (3) generating an error message that does not indicate a specification error, (4) providing output to a user of the test generator indicating the CBRT is an unreachable transition, or (5) any combination of these procedures. Other procedures for handling an unreachable transition are possible as well. After completing block 892, the test generator proceeds to block 810.

Alternatively, the test generator may stop method 800 at block 892 if a transition is determined to be unreachable. The test generator may stop the method 800 as not all requirements as expressed as conditions of the transitions of the input statechart could be tested, and so complete coverage could not be assured. In this alternative, the method 800 may end after performing the procedures of block 892. Also in this alternative, method 600 may end after performing the procedures of block 892 as well.

As an example of backward propagation using statechart 200 of FIG. 2, transition 252 (with condition 254) may be marked as an unreached transition after a forward-propagation pass through statechart 200. As such, at block 810, the test generator would determine that there are unreached transitions. Assuming that transition 252 has a higher priority than transitions 262 and 272 and so the test generator selected transition 252 as a CBRT at block 820, the test generator would generate an ATSO for the CBRT at block 830 and put the generated ATSO on a sequence list. The complete-constraint expression of the ATSO may comprise condition 254, which is a condition of the CBRT (transition 252), indicating that a variable "count" is greater than one.

At block 840, the test generator may retrieve the generated ATSO from the sequence list. At block 850, the test generator may determine that the complete-constraint expression of the generated ATSO could not be satisfied by any environments in the environment list, since none have a value of count that is greater than one. The test generator may then proceed to block 870. At block 870, the test generator may generate a previous-feasible-timestep-sequence object that represents the entry of ChildState state 240 from SecondState state 220 with the complete-constraint expression in1!=0 AND in2!=0. This complete-constraint expression is the logical conjunction of the conditions 224 and 234 for transitions 222 and 232. The unresolved constraint of the ATSO is computed to be count>1. The subsequent sequence pointer of the previous-feasible-timestep-sequence object is set to reference a copy of the ATSO.

At block 880, assuming the maximum depth was not exceeded, the test generator may add the NTSO to the sequence list. At block 890, the test generator may determine the sequence list is not empty and proceed to block 840. The procedures of blocks 840-890 continue until either a satisfiable ATSO is found or the sequence list is empty.

Returning to FIG. 6, at block 670, the test generator determines if there are unreached transitions. The test generator may determine there are unreached transitions by determining that the unreached-transition list is not empty. If there are no unreached transitions (i.e., the unreached-transition list is empty), the test generator proceeds to block 690. If there are unreached transitions, the test generator proceeds to block 680.

At block 680, the test generator determines if a sufficient number of transitions have been marked as reached by the forward-propagation pass and/or backward-propagation pass. A sufficient number of transitions may be any integer number greater than zero (e.g., one). If a sufficient number of transitions have been marked as reached, the test generator may proceed to block 640.

If an insufficient number of transitions have been marked reached by the forward-propagation pass and/or backward-propagation pass, then the test generator may proceed to block 690. Alternatively, if an insufficient number of transitions have been marked reached by the forward-propagation pass and/or backward-propagation pass, then the test generator may determine there is a specification error in the input statechart and/or end process 600.

At block 690, the test generator may perform vector output generation. Vector output generation may comprise some or all of the herein-described procedures of method 900.

Figure 9:
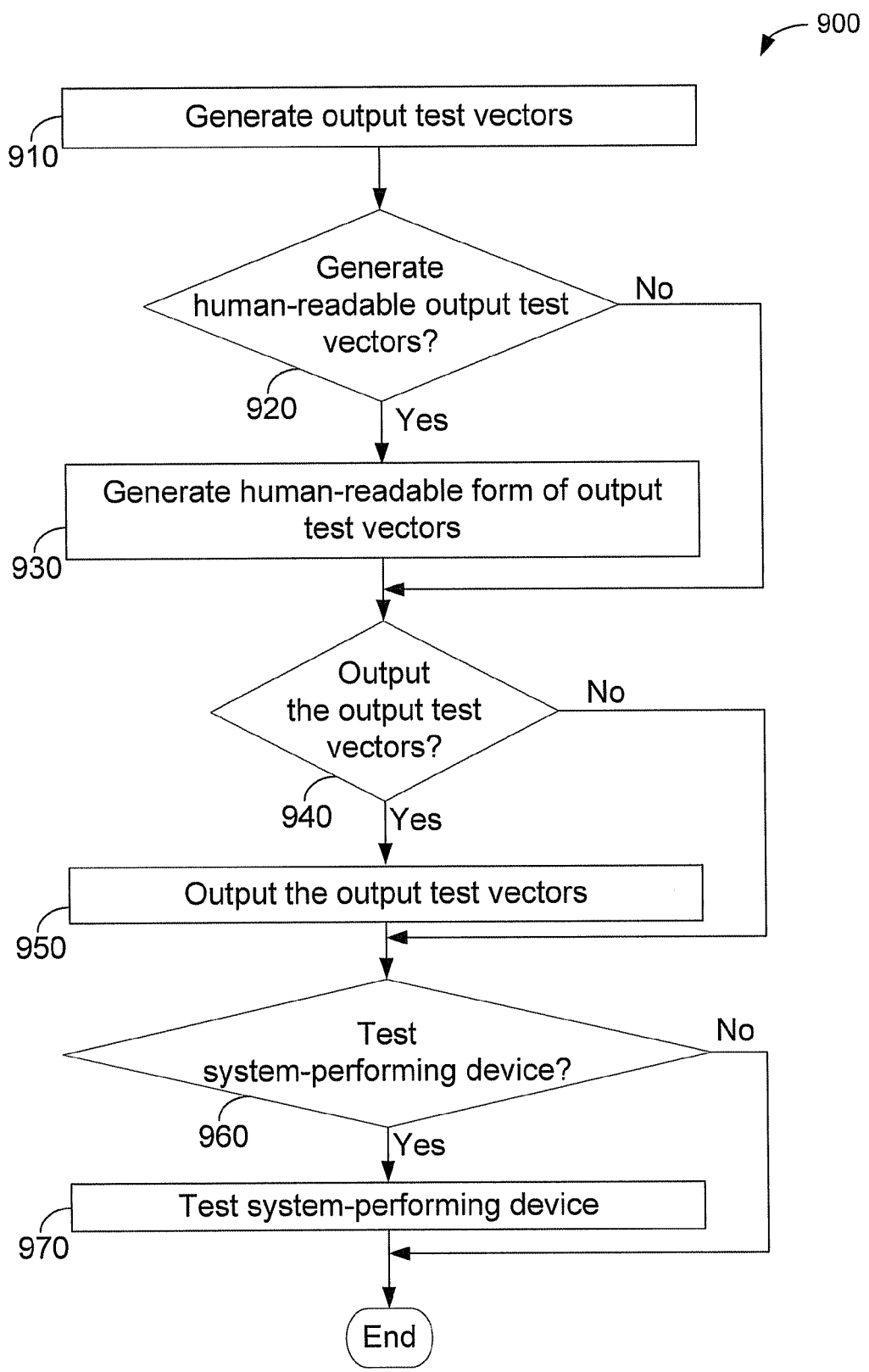
FIG. 9 is a flowchart of an example method, in accordance with embodiments of the invention.

FIG. 9 is a flowchart of an example method 900, in accordance with embodiments of the invention. Method 900 begins at block 910.

At block 910, the multi-step vectors 530 of the environments generated for transitions are used to generate a plurality of output test vectors. The environments generated for transitions may comprise the environments on the reached-transition list generated during the forward-propagation pass and/or the backward-reached transitions determined during the backward-propagation pass. Each output test vector may correspond to an executable test of the system-performing device.

Generation of the plurality of output test vectors may comprise use of the prior-state list 532, the prior-transition list 534, and/or the set of previous values 536, of each multi-step vector 530 in each environment 500 generated for transitions. The generation of an output test vector may comprise copying a multi-step vector 530 to an output test vector. Generation of the plurality of output test vectors for all transitions of the input statechart may indicate that all requirements of a system-design model that are expressed as conditions in the input statechart are testable.

Also, generating the plurality of output test vectors may comprise removing any references to statechart-defined variables from each output test vector in the plurality of output test vectors. Removing statechart-defined variables from each output test vector provides a plurality of output test vectors with only statechart-input variables and/or statechart-output variables. The use of a plurality of output test vectors with only statechart-input variables and/or statechart-output variables may allow black box testing of a system-design model and/or a system-performance device.

At block 920, a determination is made to generate a human-readable form of the plurality of output test vectors. If the plurality of output test vectors are to be generated in a human-readable form, the test generator proceeds to block 930. If the plurality of output test vectors are not to be generated in a human-readable form, the test generator proceeds to block 940.

At block 930, the test generator generates a human-readable form 1000 of the output test vectors. FIG. 10 is an example human-readable form 1000 for a plurality of output test vectors for statechart 300, depicted in FIG. 3, in accordance with embodiments of the invention. The human-readable form 1000 indicates a portion of the plurality of output test vectors generated by a test generator using statechart 300 as an input statechart.

A human-readable form of an output test vector may provide content about the reached states and/or transitions of the output test vector, values of statechart-input variables and/or statechart-output variables, and/or reached-state information. FIG. 10 shows human readable form 1000 indicating column content 1020, event information 1030, in1 value 1032, out1 value 1034, State1 information 1040, State1_1 information 1042, State1_1_1 information 1044, State4 information 1046, and State2 information 1048. As an example, row 1060 of human-readable form 1000 indicates that for event information 1030 of 1, the value of the in1 statechart-input variable is "1" as indicated in in1 value 1032 and that the value of the out1 statechart-input variable is "9" as indicated in out1 value 1034. Also, row 1062 of human-readable form 1000 provides information that state State1 330 of statechart 300 may be reached as indicated by column content 1020 with content of "REACH State State1".

Other information, such as input statechart, time and date information, test generator software information, may be provided in human-readable form 1000. FIG. 10 shows information row 1050 with input-statechart information 1052 indicating a name of an input statechart of "Chart", date information 1054 indicating the output test vectors were generated on a date of "2/2", and test generator software information 1056 indicating the test generator is the HiLiTE computer software package provided by Honeywell International, Inc. of Morristown, N.J., and that the software version of the test generator is "6.2.4.8742".

A human tester may execute a plurality of tests of the system-performing device. Each test in the plurality of tests executed by the human tester may be based on the human-readable form 1000. The test may be executed by setting inputs to the system-performing device with values equal to or contained within the constrained values specified in the output test vector for the statechart-input variables indicated in human-readable form 1000 for the test. After setting the inputs to the system-performing device, the human tester may allow the system-performing device to run. Upon completion of the run of the system-performing device, the human tester may examine the outputs of the system-performing device to determine if they satisfy the values of statechart-output variables indicated in human-readable form 1000 for the test. If the outputs of the system-performing device satisfy the values of statechart-output variables indicated in human-readable form 1000, the human tester may determine the test was successful; otherwise, the human tester may determine the test was unsuccessful.

Returning to FIG. 9, at block 940, a determination is made to output the plurality of output test vectors. If the plurality of output test vectors is to be output, the test generator proceeds to block 950. If the plurality of test vectors is not to be output, the test generator proceeds to block 960.

At block 950, the test generator outputs the plurality of output test vectors. The plurality of output test vectors may be output to a test driver. The plurality of output test vectors may be output in binary and/or alphanumeric format. The plurality of output test vectors may be stored as a data structure in data storage. The test driver may receive and/or store the received plurality of output test vectors.

The test generator may output the plurality of output test vectors via a communication interface, such as communication interface 340. Similarly, a test driver or other computing device may receive the plurality of output test vectors via a communications interface, such as communication interface 340. The test generator may output the plurality of output test vectors via a user interface, perhaps using output unit 334 of user interface 330.

At block 960, the test driver determines if the system-performing device is to be tested. The system-performing device may be tested using output test vectors received from the test generator. Alternatively, the test generator and the test driver may share computer hardware and/or software resources, and thus the test driver may directly use the output test vectors (i.e. use the output test vectors generated by the test generator without the test generator outputting the output test vectors). If the system-performing device is to be tested, the test driver proceeds to block 960. If the system-performing device is not to be tested, the method 900 ends and method 600 may end as well.

At block 970, the test driver tests the system-performing device based on the output test vectors. User input may be provided to select a variety of test factors, including but not limited to, which test(s) to be run on the system-performing device, a location of a source of output test vectors, a location and/or a name of one or more files or other structures for storing test results and/or test output, a location and/or a name of a specific system-performing device to be tested, a location for each (if any) additional test devices required to test the system-performing device, and so on. Many more test factors are possible.

A test driver may execute a plurality of tests of the system-performing device. Each test in the plurality of tests executed by the test driver may be based on a given output test vector in the plurality of output test vectors. The test may be executed by setting inputs to the system-performing device with values equal to or contained within the constrained values specified in the output test vector for the statechart-input variables. After setting the inputs to the system-performing device, the test driver may allow the system-performing device to run. Upon completion of the run of the system-performing device, the test driver may examine outputs of the system-performing device to determine if the outputs satisfy given values of statechart-output variables as indicated in the given output test vector. If the outputs satisfy the given values of statechart-output variables, the test driver may determine the test was successful; otherwise, the test driver may determine the test was unsuccessful.

After executing block 970, method 900 ends and method 600 may end as well.

CONCLUSION

Exemplary embodiments of the present invention have been described above. Those skilled in the art will understand, however, that changes and modifications may be made to the embodiments described without departing from the true scope and spirit of the present invention, which is defined by the claims. It should be understood, however, that this and other arrangements described in detail herein are provided for purposes of example only and that the invention encompasses all modifications and enhancements within the scope and spirit of the following claims. As such, those skilled in the art will appreciate that other arrangements and other elements (e.g. machines, interfaces, functions, orders, and groupings of functions, etc.) can be used instead, and some elements may be omitted altogether.

Further, many of the elements described herein are functional entities that may be implemented as discrete or distributed components or in conjunction with other components, in any suitable combination and location, and as any suitable combination of hardware, firmware, and/or software.

The invention claimed is:

1. A method for creating a plurality of output test vectors from a statechart, wherein the statechart specifies requirements of a system function to be executed by a system-performing device and comprises a plurality of states, a plurality of variables and a plurality of transitions, wherein at least one transition of the plurality of transitions comprises a condition expressed in terms of at least one variable in the plurality of variables, comprising:

providing a processor, and data storage having machine-language instructions executable by the processor to perform a method comprising:

generating a plurality of forward-reached-transition environments using a forward-propagation pass through the statechart, wherein each forward-reached-transition environment in the plurality of forward-reached-transition environments is generated for a forward-reached transition forward propagated during the forward-propagation pass;

determining a transition was unreached during the forward-propagation pass;

responsive to the determination was unreached during the forward-propagation pass, generating a plurality of backward-reached-transition environments via a backward-propagation pass through the statechart, wherein each backward-reached-transition environment in the plurality of backward-reached-transition environments is generated for a backward-reached transition propagated during the backward-propagation pass;

determining a transition was unreached during both the forward-propagation pass and the backward-propagation pass;

responsive to the determination that a transition was unreached during both the forward-propagation and backward-propagation pass, performing alternating passes of forward-propagation and backwards-propagation until an insufficient number of transitions has been reached by a pass of forward-propagation and backward-propagation;

generating a plurality of output test vectors from the plurality of forward-reached-transition environments and the plurality of backward-reached-transition environments; and outputting the plurality of output test vectors.

2. The method of claim 1, wherein at least one output test vector is generated for each transition in the plurality of transitions.

3. The method of claim 1, further comprising executing a test based on at least one output test vector in the plurality of output test vectors.

4. The method of claim 1, further comprising generating a human-readable form of at least one output test vector in the plurality of output test vectors.

5. The method of claim 1, wherein the plurality of variables comprises one or more statechart-defined variables, and wherein the forward-propagation pass comprises propagating one or more values of the one or more statechart-defined variables to satisfy at least one condition of a reachable transition.

6. The method of claim 1, further comprising:
detecting at least one specification error in the statechart.

7. The method of claim 6, wherein detecting at least one specification error in the statechart comprises detecting at least one transition whose condition is infeasible after performing both the forward-propagation pass and the backward-propagation pass.

8. A test generator, comprising:
a processor;
data storage; and
machine-language instructions stored in the data storage and executable by the processor to perform functions including:
receiving a statechart;
generating a plurality of forward-reached-transition environments using a forward-propagation pass through the statechart, wherein each forward-reached-transition environment in the plurality of forward-reached-transition environments is generated for a forward-reached transition forward propagated during the forward-propagation pass;

determining a transition was unreached during the forward-propagation pass;

responsive to the determination was unreached during the forward-propagation pass, generating a plurality of backward-reached-transition environments via a backward-propagation pass through the statechart, wherein each backward-reached-transition environment in the plurality of backward-reached-transition environments is generated for a backward-reached transition propagated during the backward-propagation pass;

determining a transition was unreached during both the forward-propagation pass and the backward-propagation pass;

responsive to the determination that a transition was unreached during both the forward-propagation and backward-propagation pass, performing alternating passes of forward-propagation and backwards-propagation until an insufficient number of transitions has been reached by a pass of forward-propagation and backward-propagation;

generating a plurality of output test vectors from the plurality of forward-reached-transition environments and the plurality of backward-reached-transition environments; and outputting the plurality of output test vectors.

9. The test generator of claim 8, wherein the machine-language instructions stored in the data storage further comprise instructions to execute at least one test in the plurality of tests.

10. The test generator of claim 8, further comprising a user interface.

11. The test generator of claim 10, wherein outputting the plurality of tests comprises outputting the plurality of tests via an output unit of the user interface.

12. The test generator of claim 10, wherein receiving a statechart comprises receiving a statechart via an input unit of the user interface.

13. The test generator of claim 10, wherein machine-language instructions stored in the data storage and executable by the processor further comprise instructions executable to receive a statechart via the user interface.

14. The test generator of claim 10, wherein machine-language instructions stored in the data storage and executable by the processor further comprise instructions executable to:

receive user input from an input unit of the user interface to determine a maximum depth of a backward-propagation pass; and during the backward-propagation pass, inhibiting the generation of a timestep whose depth exceeds the maximum depth.

15. A method for performing a backward-propagation pass through a statechart, wherein the statechart specifies requirements of a system function to be executed by a system-performing device and comprises a plurality of states, a plurality of variables and a plurality of transitions, wherein at least one transition of the plurality of transitions comprises a condition expressed in terms of at least one variable in the plurality of variables, comprising:

retrieving a candidate-backward-reachable transition (CBRT) from an unreached-transition list;

generating an associated timestep-sequence object (ATSO) from a sequence list, wherein the ATSO is associated with the CBRT;

determining if a complete-constraint expression of the generated ATSO is satisfied; and responsive to determining that the complete-constraint expression of the generated ATSO is satisfied, updating a CBRT environment as a backward-reached transition;

responsive to determining that the complete-constraint expression of the generated ATSO is not satisfied, generating one or more new-timestep-sequence objects (NTSOs); and setting an unresolved constraint of each NTSO to be a computed unresolved constraint of the ATSO after simulating effects of the ASTO.

16. The method of claim 15, further comprising:

generating an NTSO based on a previous-feasible-timestep-sequence object, wherein the previous-feasible-timestep-sequence object represents at least one feasible action taken at least one timestep prior to the current step.

17. The method of claim 16, wherein the at least one feasible action comprises an action performed within a state of the plurality of states of the statechart.

* * * * *